United States Patent
Sama

(10) Patent No.: US 10,506,493 B2
(45) Date of Patent: Dec. 10, 2019

(54) DEVICE AND A METHOD FOR CONTROLLING AN IP CORE NETWORK

(71) Applicant: Orange, Paris (FR)

(72) Inventor: Malla Reddy Sama, Munich (DE)

(73) Assignee: ORANGE, Paris (FR)

( * ) Notice: Subject to any disclaimer, the term of this patent is extended or adjusted under 35 U.S.C. 154(b) by 184 days.

(21) Appl. No.: 15/541,689

(22) PCT Filed: Dec. 30, 2015

(86) PCT No.: PCT/FR2015/053779
§ 371 (c)(1),
(2) Date: Jul. 5, 2017

(87) PCT Pub. No.: WO2016/110632
PCT Pub. Date: Jul. 14, 2016

(65) Prior Publication Data
US 2018/0027478 A1   Jan. 25, 2018

(30) Foreign Application Priority Data
Jan. 5, 2015   (FR) ...................................... 15 50037

(51) Int. Cl.
*H04W 40/36*   (2009.01)
*H04W 28/02*   (2009.01)
(Continued)

(52) U.S. Cl.
CPC ............ *H04W 40/36* (2013.01); *H04L 45/38* (2013.01); *H04L 63/164* (2013.01);
(Continued)

(58) Field of Classification Search
CPC ....... H04L 12/721; H04L 29/06; H04L 45/38; H04L 63/166; H04L 63/164; H04W 28/02;
(Continued)

(56) References Cited

U.S. PATENT DOCUMENTS

| | | | |
|---|---|---|---|
| 2012/0087260 A1* | 4/2012 | Devarapalli | H04W 24/08 370/252 |
| 2014/0254373 A1 | 9/2014 | Varma | |

(Continued)

FOREIGN PATENT DOCUMENTS

WO   WO 2014/188136   11/2014

OTHER PUBLICATIONS

International Search Report and Written Opinion dated Mar. 29, 2016 for Application No. PCT/FR2015/053779.
(Continued)

*Primary Examiner* — Kyaw Z Soe
(74) *Attorney, Agent, or Firm* — Knobbe, Martens, Olson & Bear, LLP

(57) ABSTRACT

A control device for controlling an IP core network is disclosed. The device includes an interconnection gateway for connection with an external network and switches each connected to at least one access point. The device is configured to communicate with a control entity for controlling the switches and/or a control entity for controlling the gateway, to obtain communications parameters for a communications session of a communication terminal connected to an access point and comprising at least one parameter relating to a communications tunnel between a switch connected to the access point and the terminal. The device is configured to use said at least one communications parameter to produce at least one processing rule for processing data flows for the session, to be applied by the gateway, the switch, and/or the access point. The device is configured to transmit at least one rule to that piece of equipment.

20 Claims, 7 Drawing Sheets

(51) Int. Cl.
  *H04L 12/721* (2013.01)
  *H04W 76/12* (2018.01)
  *H04L 29/06* (2006.01)
  *H04L 12/715* (2013.01)
  *H04L 12/801* (2013.01)

(52) U.S. Cl.
  CPC ....... *H04L 63/166* (2013.01); *H04W 28/0226* (2013.01); *H04W 76/12* (2018.02); *H04L 45/64* (2013.01); *H04L 47/19* (2013.01); *H04L 63/0428* (2013.01)

(58) Field of Classification Search
  CPC .. H04W 40/36; H04W 28/0226; H04W 76/12
  See application file for complete search history.

(56) References Cited

U.S. PATENT DOCUMENTS

2014/0269321 A1* 9/2014 Kamble .................. H04L 47/31
  370/236
2015/0181459 A1* 6/2015 Zhu ..................... H04L 65/1033
  370/236

OTHER PUBLICATIONS

Hampel, et al., Applying Software-Defined Networking to the Telecom Domain, Computer Communications Workshops, 16$^{th}$ IEEE Global Internet Symposium, 2013, pp. 133-138.

* cited by examiner

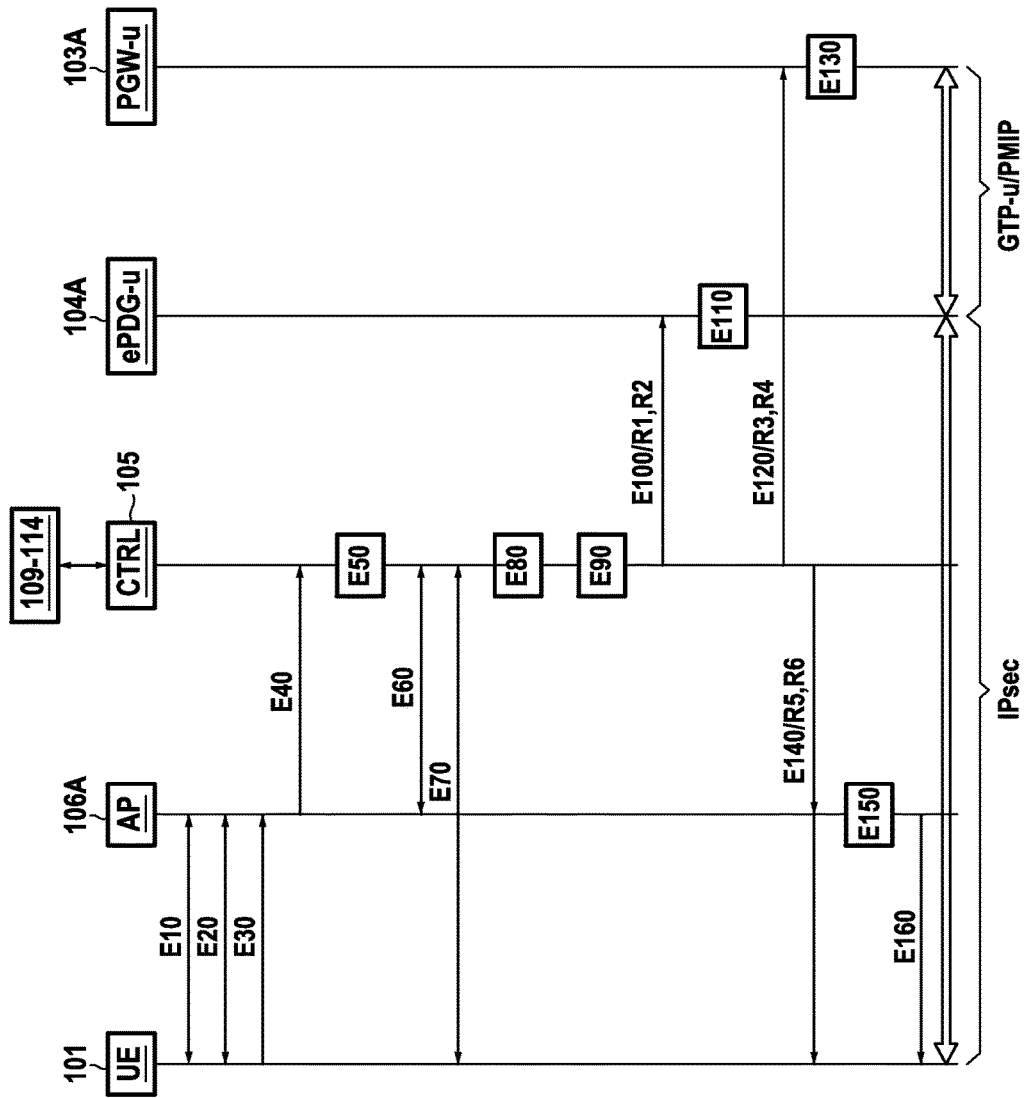

DEVICE AND A METHOD FOR CONTROLLING AN IP CORE NETWORK

RELATED APPLICATIONS

This application is the U.S. National Phase of Application No. PCT/FR2015/053779 entitled "DEVICE AND METHOD FOR MONITORING AN IP NETWORK CORE" filed Dec. 30, 2015, which designated the United States, and which claims the benefit of French Application No. 1550037filed Jan. 5, 2015.

BACKGROUND OF THE INVENTION

The invention relates to the general field of telecommunications, and more particularly it concerns a novel architecture for an Internet protocol (IP) core network.

A preferred but non-limiting application of the invention thus lies in the work currently being undertaken by the 3GPP standard to define the evolved packet core (EPC) network for use within the evolved packet system (EPS) architecture as proposed by the consortium.

Over the last few years, there has been unprecedented increase in mobile telecommunications traffic, spurred on by the appearance of new mobile applications, new terminals, and ever higher communication data rates. Conversely, a recent study emphasizes that the revenues of operators are decreasing exponentially in spite of the increase in traffic, with the costs of developing and operating networks being at the point of exceeding the revenues generated by using them. This can be explained in part by the fact that present network architectures are rather poorly adapted to satisfying this dual problem of high demand in terms of traffic while also remaining a source of revenue for operators.

In this context, the evolved packet system (EPS) architecture was defined by the 3GPP consortium to provide IP connectivity between a user terminal and external packet data networks (PDNs), capable of providing the terminal with various communications services, such as voice over IP (VoIP) services, data downloading, videos on demand, etc. Such an external data packet network may for example be the Internet public network or a data center. That architecture is presently under rapid development. Specifically, these expected traffic models change very dynamically and often unpredictably, such that new technical and financial constraints are placed on the operators of telecommunications networks.

One of the major stakes in the EPS architecture, and more particularly in the evolved packet core (EPC) network on which that architecture relies, is to provide an IP connectivity service on demand. This service relies on communications sessions being handed over in a manner that is temporary and transparent for the user from one piece of equipment to another within a single access network or from one access network to another. The term "transparent" is used to mean that the transfer must be capable of taking place without interrupting the user's communications sessions and while minimizing any loss of data packets exchanged during those sessions. This constraint is particularly critical at present in situations where it is envisaged that a terminal might be mobile between access points of a given non-licensed access network, such as for example a wide local area network (WLAN), or between a non-licensed access network to a licensed access network, such as a 3GPP access network.

The term "licensed" network is used herein to mean an access network that uses a frequency spectrum that is subjected to utilization licenses, such as for example the 2G/3G/4G network or indeed the 5G network. In contrast, "non-licensed" access networks make use of frequencies that are freely available. By way of example, one such network is a WLAN or a WiFi network.

FIG. 1 shows the EPC network architecture as presently envisaged by the 3GPP standard, together with the various pieces of equipment on which it relies. By way of indication, provision for exchanges between those pieces of equipment for the purpose of transferring data (i.e. in the data plane or user plane) are represented by continuous lines, whereas provisions for exchanges of signaling between those pieces of equipment in order to support such transfers of data (i.e. in the control or signaling plane) are represented by dashed lines.

In the example shown in FIG. 1, an access point 1A of a non-3GPP access network is connected to an evolved packet data gateway (ePDG) 2 via a communications interface using a communications tunnel set up using the Internet protocol security (IPsec). The ePDG gateway 2 is connected via an S2a/S2b communications interface to a PDN gateway (PGW) 3 for interconnection with an external packet data network 4. The S2a/S2b communications interface relies on setting up a communications tunnel using the GPRS tunneling protocol (GTP) communications protocol or using the proxy mobile IP protocol (PMIP). The PGW gateway 3 and the external network 4 are connected together via an SGi communications interface.

In that architecture, a base station 5 of a 3GPP access network (e.g. an LTE or eUTRAN access network) is connected to a serving gateway (SGW) data transfer gateway 6 via an S1-U communications interface, and to equipment 7 for managing terminal mobility known as a mobile management entity (MME) via an S1-MME communications interface.

The SGW gateway 6 is connected to the PGW gateway 3 via an S5 communications interface (comprising S5-U signaling supporting exchanges of data in the user plane and S5-C signaling supporting exchanges of data in the control plane). This S5 communications interface also relies on the GTP communications protocol. The SGW gateway 6 is also connected to the MME equipment 7 via an S11 communications interface.

The MME equipment 7 is in charge of providing IP connectivity for terminals when they are in a situation of mobility within the 3GPP access network. It is connected via an S6a communications interface to a user database 8 also known as the home subscriber server (HSS).

In this context, consideration is given to a user connected via a terminal to the non-3GPP access network via the access point 1A. This user is participating in one or more communications sessions set up between the access point 1A and the PGW gateway 3 for interconnection with the external network 4, and passing via the ePDG gateway 2.

In the architecture as set out at present by the 3GPP consortium and as shown in FIG. 1, if the terminal discovers a new access point 1B of the non-3GPP access network and connects to the new access point, all of the active sessions of the terminal as set up via the access point 1A are interrupted, and need to be set up again, and this applies regardless of whether the access point 1B is or is not connected to the same ePDG gateway 2 as the access point 1A. The same applies when the terminal connects to another access network, and in particular to a base station 5 of the 3GPP access network.

These interruptions of the communications sessions of the terminal result firstly in a poor quality of experience (QoE)

for the user of the terminal, and secondly to a large amount of signaling on the network in order to set the sessions up again, which can lead to a period of temporary congestion in the network.

The EPC architecture as presently designed gives little or no flexibility for mitigating these difficulties and for offering an on-demand IP connectivity service. Specifically, the various above-described pieces of equipment of the EPC architecture, and in particular the MME equipment 7, the SGW gateway 6, the PGW gateway 3, the ePDG gateway 2, and the HSS subscriber server 8 are provided by hardware that is deployed, provisioned, and configured in a manner that is static, so it is difficult to change any behavior. Furthermore, those pieces of equipment present close coupling firstly between hardware and software aspects, and secondly between the user plane and the control (or signaling) plane, which cannot be modified dynamically, and thus provide no flexibility.

Consequently, there exists a need for an IP core network architecture that does not present such drawbacks and that makes it possible to provide an on-demand IP connectivity service to users with a quality of experience that matches their needs and their expectations.

OBJECT AND SUMMARY OF THE INVENTION

In particular, the invention satisfies this need by providing a control device for controlling an IP core network comprising at least one interconnection gateway suitable for connecting with at least one external packet data network and a plurality of switches, each switch being connected to at least one access point of an access network, the control device comprising:

a communications module suitable for communicating with a control entity for controlling switches and with a control entity for controlling said at least one interconnection gateway, the communications module being configured to obtain communications parameters from the control entities for use during a communications session of a terminal, the terminal being connected to an access point of the access network, these communications parameters comprising at least one communications parameter relating to a communications tunnel between a switch connected to the access point and the terminal as set up for said session using a first communications protocol, and at least one communications parameter relating to a communications tunnel between the switch and an interconnection gateway connected to the switch as set up for said session using a second communications protocol distinct from the first protocol;

a control module configured to produce, on the basis of at least one communications parameter obtained by the communications module, at least one processing rule for processing data flows relating to the communications session, the processing rule being for application by a piece of equipment selected from said interconnection gateway, said switch, and/or the access point; and a transmission module for transmitting said at least one processing rule to said piece of equipment for application to the data flows relating to said communications session.

Correspondingly, the invention also provides a control method for controlling an IP core network comprising at least one interconnection gateway for connecting with at least one external packet data network and a plurality of switches, each switch being connected to at least one access point of an access network, the control method being for implementation by a control device and comprising:

a communications step for communicating with a control entity for controlling the switches and/or with a control entity for controlling said at least one interconnection gateway, the step comprising obtaining communications parameters from said control entities for use during a communications session of a terminal, the terminal being connected to an access point of the access network, these communications parameters comprising at least one communications parameter relating to a communications tunnel between a switch connected to the access point and the terminal as set up for said session using a first communications protocol, and at least one communications parameter relating to a communications tunnel between the switch and an interconnection gateway connected to the switch as set up for said session using a second communications protocol distinct from the first protocol;

a control step comprising using at least one communications parameter obtained during the communication step to produce at least one processing rule for processing data flows relating to the communications session, the processing rule being for application by a piece of equipment selected from said interconnection gateway, said switch, and/or the access point; and a transmission step for transmitting said at least one processing rule to said piece of equipment for application to the data flows relating to said communications session.

The term "communications session" is used herein to mean a session initiated by the terminal or by the core network in the context of a service made available by an external packet data network managed by the core network. The communications session enables data to be exchanged between the terminal and the external network via the core network. Each communications session is associated with a quality of service that depends on the type of traffic being exchanged during the session (e.g. a file transfer protocol (FTP) session, a voice over IP communications session, etc.).

Furthermore, the term "data flows relating to a communications session" is used herein to mean data flows that are exchanged during this session over an uplink (from the terminal towards the external network) or over a downlink (from the external network to the terminal).

The invention thus proposes a core network architecture relying on the network principles defined by software known as a software defined network (SDN) and in which the user plane (or data plane) and the control plane (or signaling plane) are decoupled. This architecture advantageously provides greater flexibility for the core network and makes it possible to respond in a manner that is satisfactory in terms in particular of user quality of experience to an ever-increasing demand for IP connectivity.

In accordance with the invention, the intelligence of the core network (i.e. the control functions) is centralized in a control device, e.g. a software device. The user plane and the behavior of pieces of equipment in the network contributing to the user plane are defined by processing rules or data (or traffic) transmission rules relating to the terminals managed by the core network and produced by the control device. This results in a novel IP core network architecture that is programmable, making it possible for the user plane and for the control plane to be (re)configured dynamically as a function of demand.

More precisely, by means of the control device, the invention proposes setting up and controlling a user plane which relies on interconnection gateways of the IP core network leading to external packet data networks, on switches deployed in the IP core network, and on access points to an access network that are connected to switches. The invention thus applies in preferred manner to a non-licensed access network such as a non-3GPP access network and more particularly to a WLAN, making use of equipment that is similar in the user plane. In accordance with the invention, the access points, the switches, and the interconnection gateways are connected directly to the control device, thereby facilitating the control that it exerts over those pieces of equipment.

The invention also makes it possible in transparent manner to manage mobility of terminals within the access network from one access point to another. Specifically, the invention makes provision for allocating communications parameters to a communications session of a terminal that enables account to be taken of the mobility of the terminal and, where appropriate, of any change of its access point, its switch, or indeed its interconnection gateway during the session, in other words that is capable of adapting to a change in the user plane. Specifically to respond to the problem of non-licensed networks such as WLANs, these communications parameters include in particular:

- a communications parameter relating to a communications tunnel between a switch connected to the access point and the terminal as set up for said session using a first communications protocol (typically IPsec); and
- a communications parameter relating to a communications tunnel between the switch and an interconnection gateway connected to the switch and set up for this session using a second communications protocol distinct from the first protocol (typically GTP or PMIP).

The processing rules transmitted by the software control device are advantageously prepared by that device on the basis of communications parameters that result from interactions with the control functions of the network, and in particular with a control entity for the interconnection gateways and a control entity for the switches. The control device may also interact with other control functions in order to produce these processing rules, such as for example a dynamic host configuration protocol (DHCP) function, an HSS/AAA server, etc. In a software solution, these control functions may be situated, by way of example, above the control device and may communicate therewith via application programming interfaces (APIs).

As mentioned above, the architecture proposed by the invention makes it possible easily to update the processing rules that enable the control device to control the user plane by acting directly at the level of these various pieces of equipment. The management of the core network, and in particular the procedures for setting up and maintaining communications sessions within the core network in the event of mobility between different access points to a common access network are therefore greatly simplified. By means of this centralized method, the control device, by appropriately adapting the processing rules that it uses for controlling pieces of equipment in the user plane can thus easily make available an IP connectivity service that satisfies user demand and relying on terminal mobility without interruption (i.e. "seamlessly") so that this is transparent for users. The experience of users is thus improved and enhanced.

Various communications parameters may be obtained by the control device and used when producing the processing rules enabling it to control pieces of equipment in the user plane.

Thus, in a variant, the communications module may be configured to obtain from the switch control entity at least one communications parameter selected from the following:
- an address of the switch connected to the access point to which the terminal is connected;
- an endpoint identifier or a generic routing encapsulation key of the communications tunnel using the second protocol between the switch and the interconnection gateway; and
- at least one cryptographic key associated with the communications tunnel using the first protocol between the switch and the terminal.

In another variant, the communications module may be configured to obtain from the control entity of said at least one interconnection gateway an identifier of an endpoint of the communications tunnel using the second protocol between the switch and the interconnection gateway.

These various parameters make it possible to satisfy various mobility situations for the terminal.

In addition, in a particular embodiment, at least one communications parameter relating to the communications tunnel using the first protocol or to the communications tunnel using the second protocol does not vary during the communications session of the terminal.

This makes it possible to limit the amount of signaling exchanged within the core network in order to set up and maintain a communications session of the terminal, in particular in situations of terminal mobility involving the communications session being transferred (handover).

As mentioned above, the communications parameters obtained by the control device enable it to produce processing rules that satisfy various situations of a terminal relative to the core network.

Thus, in a particular embodiment of the invention, during a procedure of attaching the terminal to the access point of the access network, the control module is configured to produce:

- a processing rule for processing data flows coming from the terminal to be applied by the switch and comprising:
  - an address of the interconnection gateway; and
  - an endpoint identifier or a generic routing encapsulation key of the communications tunnel using the second protocol between the switch and the interconnection gateway;
- a processing rule for processing data flows for the terminal to be applied by the switch and comprising:
  - an address of the access point; and
  - at least one cryptographic key associated with the communications tunnel using the first protocol between the switch and the terminal;
- a processing rule for processing the data flows coming from the terminal to be applied by the interconnection gateway and comprising an identifier of an external packet data network;
- a processing rule for processing data flows for the terminal to be applied by the interconnection gateway and comprising:
  - an address of the switch; and
  - an endpoint identifier or a generic routing encapsulation key of the communications tunnel using the second protocol between the switch and the interconnection gateway;

a processing rule for processing data flows coming from the terminal to be applied by the access point and comprising an address of the switch; and a processing rule for processing data flows for the terminal to be applied by the access point and comprising an address of the terminal.

In another embodiment, during a handover procedure for transferring the communications session of the terminal from a first access point to a second access point of the access network, the first access point and the second access point being connected to the same switch, the control module is configured to produce:

a processing rule for processing data flows for the terminal to be applied by the switch and including an address of the second access point; and a processing rule for processing data flows coming from the terminal to be applied by the second access point and including an address of the switch.

In yet another embodiment, during a handover procedure for transferring the communications session of the terminal from a first access point connected to a first switch to a second access point of the access network connected to a second switch, the control module is configured to produce:

a processing rule for processing data flows for the terminal to be applied by the interconnection gateway comprising:
an address of the second switch; and
an endpoint identifier or a generic routing encapsulation key of the communications tunnel using the second protocol between the interconnection gateway and the second switch;

a processing rule for processing data flows coming from the terminal to be applied by the second switch and comprising:
an address of the interconnection gateway; and
an endpoint identifier or a generic routing encapsulation key of the communications tunnel using the second protocol between the second switch and the interconnection gateway;

a processing rule for processing data flows for the terminal to be applied by the second switch and comprising the address of the second access point; and a processing rule for processing data flows coming from the terminal to be applied by the second access point and comprising an address of the second switch.

The invention thus provides an architecture that makes it possible to respond effectively to various terminal mobility situations within the core network, when the terminal moves within a given access network.

The invention also makes it possible to manage terminal mobility situations in which the terminal goes from one access network (e.g. WLAN) to another (e.g. 3GPP or LTE or E-UTRAN).

To this end, in a particular embodiment of the invention:
the control module is also configured to produce at least one processing rule to be applied by at least one base station of another access network to data flows relating to the communications session; and
the transmission module is configured to transmit this processing rule to said at least one base station to be applied to the data flows.

In other words, the control device is suitable not only for controlling access points of an access network such as a WLAN, but also base stations of another network such an 3GPP network. The invention thus proposes a hybrid IP core network architecture capable of handling different access technologies and in which the user plane (or the data plane) and the control plane (or the signaling plane) are advantageously decoupled.

This architecture is particularly well suited to handling the convergence between fixed and mobile networks. It gives rise to flexibility in the management of the core network and to an improvement in the reliability of IP connectivity made available to terminals thereby.

In an embodiment, in order to transfer the communications session of the terminal between two access networks, during a handover procedure for transferring the communications session of the terminal from an access point of the access network to the base station, the control module may be configured to prepare:

a processing rule for processing data flows coming from the terminal to be applied by the interconnection gateway and comprising an identifier of an external packet data network;

a processing rule for processing data flows for the terminal to be applied by the interconnection gateway and comprising:
an address of the base station; and
an endpoint identifier of a communications tunnel between the interconnection gateway and the base station set up for the session of the terminal using the second protocol; and a processing rule for processing data flows coming from the terminal to be applied by the base station and comprising:
an address of the interconnection gateway; and
an endpoint identifier of the communications tunnel using the second protocol between the base station and the interconnection gateway.

The communications module may also be configured to communicate with a mobility management entity in said other access network and to obtain the address of the base station from that entity.

In these various different session transfer (handover) situations as described above, the control module may also be configured to produce a processing rule for processing data flows for the terminal to be applied by the second access point and including an address of the terminal.

In a variant, this address may be communicated by the terminal to the second access point during a handover stage of preparing to transfer the session.

As mentioned above, the invention proposes a novel IP core network architecture that relies on a control device and also on various control entities that interact with the control device and that enable it to control the user plane.

The invention thus also provides a control entity for controlling a plurality of switches of an IP core access, each switch being connected to an interconnection gateway for connection with an external packet data network and to at least one access point of an access network, this control entity comprising:

a first allocation module configured to allocate at least one communications parameter to a communications session of a terminal connected to an access point of the access network, the communications parameter relating to a communications tunnel between a switch connected to the access point and the terminal and set up for the communications session using a first communications protocol; and a second allocation module configured to allocate at least one communications parameter to the communications session, the communications parameter relating to a communications tunnel between the switch and an interconnection gateway connected to the switch and set up for the communications session using a second communications protocol distinct from the first protocol.

In a particular embodiment, the control entity further comprises a selection module for selecting a switch of the IP core network for the communications session of the terminal.

The invention also provides an IP core network comprising:
- at least one interconnection gateway for connection with at least one external packet data network;
- a plurality of switches connected to said at least one interconnection gateway and to access points of an access network;
- a control entity for controlling said at least one interconnection gateway;
- a switch control entity; and
- at least one IP core network control device of the invention and suitable for controlling the interconnection gateway, the plurality of switches, and the access points of the access network.

The control entity and the IP core network benefit from the same advantages as the control device.

In a particular embodiment, the various steps of the control method are determined by computer program instructions.

Consequently, the invention also provides a computer program on a data medium, the program being suitable for being performed in a control device or more generally in a computer, the program including instructions adapted to perform steps of a control method as described above.

This program may use any programming language, and be in the form of source code, object code, or code intermediate between source code and object code, such as in a partially compiled form, or in any other desirable form.

The invention also provides a computer-readable data medium including instructions of a computer program as mentioned above.

The data medium may be any entity or device capable of storing the program. For example, the medium may comprise storage means such as a read only memory (ROM), e.g. a compact disk (CD) ROM, or a microelectronic circuit ROM, or indeed magnetic recording means, such as a floppy disk or a hard disk.

Furthermore, the data medium may be a transmissible medium such as an electrical or optical signal, suitable for being conveyed by an electrical or optical cable, by radio, or by other means. The program of the invention may in particular be downloaded from an Internet type network.

Alternatively, the data medium may be an integrated circuit in which the program is incorporated, the circuit being adapted to execute or to be used in the execution of the method in question.

In other embodiments, it is also possible to envisage that the control method, the control device, the switch control entity, and the IP core network of the invention present in combination all or some of the above-specified characteristics.

BRIEF DESCRIPTION OF THE DRAWINGS

Other characteristics and advantages of the invention appear from the following description given with reference to the accompanying drawings, which show an embodiment having no limiting character. In the figures:

FIGS. 6 to 9 show procedures for attaching and transferring communications sessions of a terminal as performed in accordance with the invention by the IP core network shown in FIG. 4.

DETAILED DESCRIPTION OF THE INVENTION

As mentioned above, the invention proposes a novel architecture for an IP core network that enables terminals to be mobile and that relies on the concept of a software defined network (SDN). This novel architecture advantageously serves to improve flexibility and reliability in terms of core network IP connectivity. Specifically, it makes it easier to perform handover procedures for transferring communications sessions between various access points of a single access network, and also between different access networks (e.g. in a context of convergence between fixed and mobile networks), and to do so in a manner that is transparent for users, i.e. seamlessly, without interrupting sessions.

More precisely, the invention defines a new control plane in which a plurality of pieces of equipment selected from interconnection gateways and switches of the core network, access points to an access network, and where appropriate base stations of another access network, all of which pieces of equipment participating in the user plane, are controlled by a control device. In the presently-described embodiment, the control device is a software control device that is connected via an application programming interface (API) to various control functions of the network, and more particularly to an entity for controlling interconnection gateways and to an entity for controlling switches of the core network.

Figure 1:
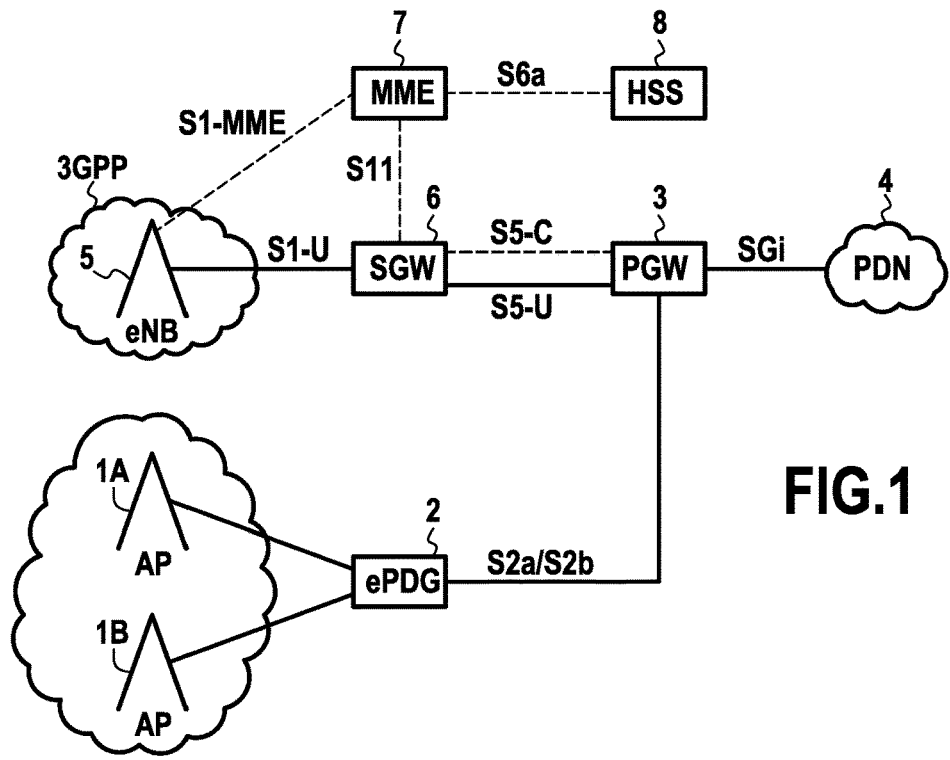
FIG. 1, described above, is a diagram showing an EPC core network architecture as proposed by the 3GPP standard.
Figure 2:
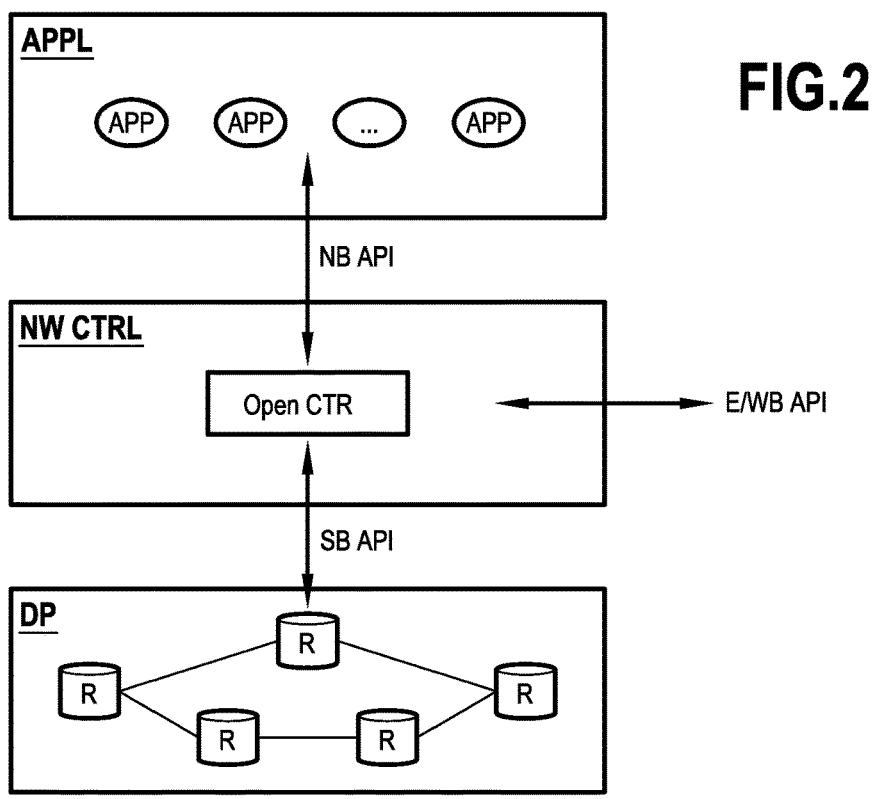
FIGS. 2 and 3 show the principles of a software defined network (SDN)
Figure 3:
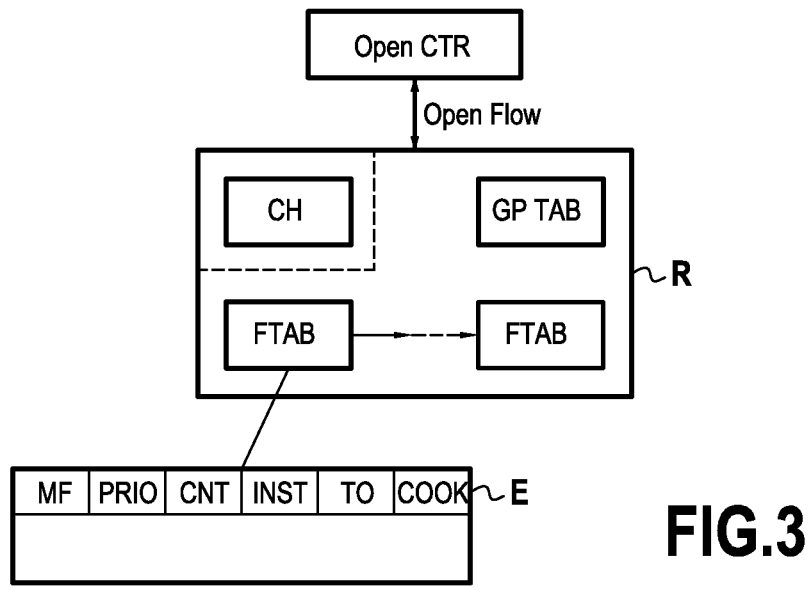

In order to facilitate understanding of the invention, the description begins with reference to FIGS. 2 and 3 by briefly summarizing the general principles of an SDN architecture. In the example used for illustrating these principles, it is assumed that the architecture relies on using the OpenFlow protocol, which is known to the person skilled in the art and which is described in particular in the document "OpenFlow switch specification, version 1.3.1", September 2012.

As mentioned above, the SDN concept serves to specify the behavior of pieces of network equipment by using high level control programs, thus making it easy to automate certain tasks such as configuring network equipment or managing policies that are applied at network level.

For this purpose, the SDN architecture centralizes the intelligence of the network (i.e. the functions for controlling the network and its equipment) in a software control device (or controller).

The behavior of the equipment in the network, such as switches or routers, in the presence of data about a communications session is then defined by the control device using "processing" rules that it transmits to the pieces of network equipment. These rules are stored by the network equipment, and they are for application by that equipment on receiving data about a communications session. For example, these rules specify the pieces of network equipment to which data should be transferred (i.e. to which traffic should be transferred) in the uplink and in the downlink, the actions to be performed on that data, etc.

FIG. 2 summarizes this mode of operation by diagrammatically modeling an SDN architecture as three layers:
- a bottom layer DP, modeling the data plane (user plane) and comprising the switches/routers R of the network controlled by the control device (these switches/routers R may equally well be physical or virtual);
- an intermediate layer NW CTRL modeling specifically the software control device given by the reference "OpenCTR"; and
- a top layer APPL, modeling various APP control applications or functions used by the control device OpenCTR for controlling the switches/routers R of the data plane DP and for producing the processing rules.

The various above-mentioned layers communicate between one another via programming interfaces or APIs known as "NorthBound API" and "SouthBound API" (written "NB API" and "SB API" in FIG. 2). The control device OpenCTR also communicates with other controllers via programming interfaces referred to as "East/West Bound API" (and written "E/WB API" in FIG. 2).

The programming interfaces SB API between the control device OpenCTR and the data plane in this example make use of the OpenFlow communications protocol. The programming interfaces NB API and E/WB API are based on any open communications protocol, e.g. selected from the protocols known as simple object access protocol (SOAP), remote procedure call (RPC), or representational state transfer (REST).

As mentioned above, and as shown in FIG. 3, the OpenFlow protocol makes it easy for the software control device OpenCTR to control each switch/router R by means of a set of data processing rules, including in particular data transmission (or transfer, or indeed routing) rules for application by the switch/router R on receiving data relating to a communications session (in other words data exchanged during a communications session).

These processing rules are determined by the control device OpenCTR, e.g. as a function of the policy envisaged by the operator for managing the network. They specify the processing that is to be applied by each switch/router R on receiving a packet of a data flow associated with a communications session of a determined terminal, and following packets associated with the same flow.

These processing rules are stored in each switch/router R in the form of flow tables (FTAB), having entries that can easily be modified by the control device OpenCTR using the OpenFlow protocol (e.g. adding, updating, deleting entries in the table).

By way of illustration, an entry E of one such flow table FTAB is shown in FIG. 3. It is in the form of a plurality of fields or parameters to be examined by the switch/router R on receiving a data packet in order to identify the processing that is to be applied to the packet (e.g. the piece of equipment in the core network to which the data packet should be transferred). By way of example, these fields include a match field (MF) field indicating the header fields of packets concerned by this entry E of the table, together with an instructions (INST) field defining the processing to be applied to packets having a header including the fields identified by the MF. Naturally, other fields may also be defined for each entry of the table FTAB in addition to those two fields, as shown in FIG. 3, e.g. such as a timeout (TO) field, a priority (PRIO) field, a cookie (COOK) field, or a counters (CNT) field.

The switch/router R uses the flow tables FTAB as defined in this way as follows.

On receiving a data packet, it searches in the stored tables FTAB to see whether an MF field of an entry coincides with the header fields of the packet. Where appropriate, the instructions associated with this entry and specified in the corresponding INST field are executed by the switch/router R on the data packet (e.g. transfer the packet to a determined piece of equipment of the network as identified by parameters such as its IP address and/or a UDP port, or else modify or delete the packet).

In contrast, if no entry coincides with the received packet, the received packet is transferred to the control device OpenCTR, which creates a new flow table entry together with processing associated with that entry (in other words a new processing rule), and transmits the entry to the switch/router R so that it is stored in a flow table associated with the terminal.

It can thus readily be understood that in the light of the above-described mode of operation, the control and data planes in an SDN architecture are decoupled.

With reference to FIGS. 4 to 9, there follows a description of how the invention advantageously proposes applying this principle to an IP core network architecture, and more particularly, in the presently-described embodiment, to a hybrid core network architecture suitable for enabling mobile and fixed networks to converge.

In the presently-described embodiment, and in order to simplify the description, when the description does not provide any detail, the functions and the modes of operation of the pieces of equipment in the IP core network architecture described (e.g. interconnection gateways, base stations (eNodeB), access points, mobility management equipment (MME), equipment for setting up communications tunnels using the GTP, PMIP, or IPsec, protocol, etc.) are similar or identical to the description in the documents 3GPP TS 23.401 and 3GPP TS 23.402 published by the 3GPP consortium, and they are not described in detail herein.

This assumption is nevertheless not limiting and the invention can equally well be applied to other core network architectures based on the IP protocol ("all IP networks"), such as for example a proprietary core network architecture. In addition, the invention also applies in the context of an IP core network to which access is obtained via a single access network, such as for example a WLAN access network.

Figure 4:
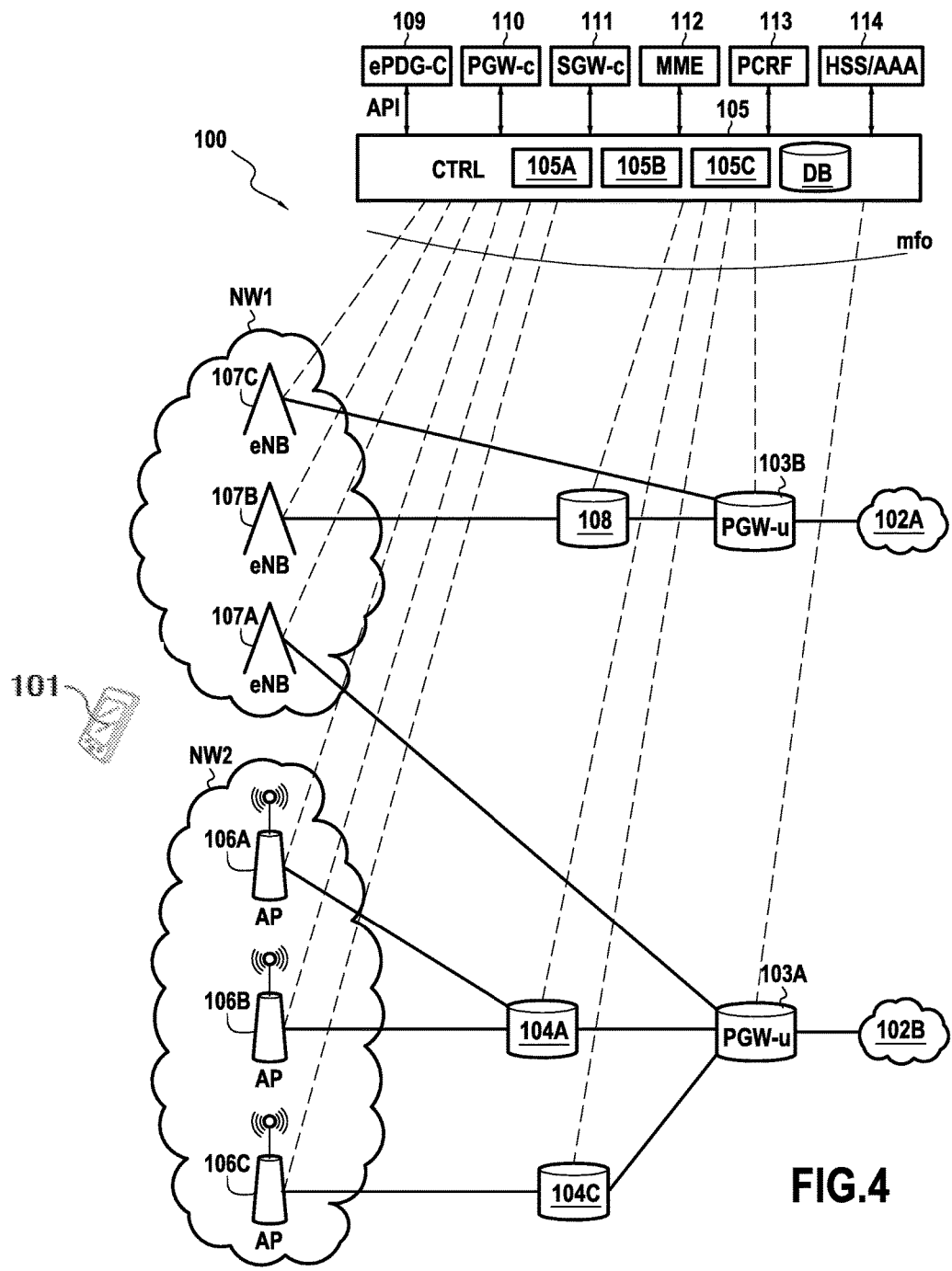
FIG. 4 shows an IP core network in accordance with the invention, in a particular embodiment.

FIG. 4 shows a hybrid core network 100 in accordance with the invention, in a particular embodiment in which the core network 100 enables a UE terminal 101 to access services made available by one or more external packet data networks (PDNs) 102, via two different access networks NW1 and NW2.

In the presently-described example, the access network NW1 is an LTE or an E-UTRAN access network, while the access network NW2 is a WLAN access network. Nevertheless, these assumptions are not limiting and the invention applies to other access networks using licensed radio spectrum such as for example a 2G access network (e.g. GSM, GPRS, etc.), a 3G access network (UMTS), or a 4G or even a 5G network, or indeed a non-licensed network (e.g. WiFi). In addition, the invention may be applied to a core network that supports more than two access networks.

PDN networks 102 are connected to the core network 100 via interconnection gateways 103, also referred to as PGW-u (u refers to the user plane), giving the PDN networks 102 access to the core network 100 and vice versa. This interconnection gateways 103 have well-known network address translation (NAT) functions enabling them to translate public IP addresses used on the PDN networks 102 into private IP addresses used in the core network 100. In the example shown in FIG. 4, consideration is given to two interconnection gateways 103A and 103B leading to two distinct PDN networks, respectively 102A and 102B (e.g. for example the network 102A is the Internet public network and the network 102B is a data center).

The IP core network 100 also has a plurality of switches 104 and a control device 105 in accordance with the invention suitable for controlling the switches and the interconnection gateways 103.

The switches 104 are connected to one or more access points 106 of the access network NW2. Thus, in the example of FIG. 4, the switch 104A is connected to the access points 106A and 106B, while the switch 104C is connected to the access point 106C.

The function of the switches is to route the data flows coming from terminals connected to the access points 106 to the interconnection gateways 103, and vice versa. These switches are also referred to as ePDG-u (where u refers to the user plane), since they implement functions in the user plane that are similar or identical to corresponding functions performed by the ePDG gateways described in the EPC architecture as defined by the 3GPP consortium. In particular, they are capable of encapsulating and de-encapsulating data packets in accordance with the IPsec protocol (a "first" protocol in the meaning of the invention) for downlink communications going to the terminals 101, and in accordance with the GTP protocol or the PMIP protocol (a "second" protocol in the meaning of the invention) for uplink communications going to the interconnection gateways 103.

In other words, the switches 104 are capable of setting up communications tunnels equally well using the IPsec protocol and using the GTP or PMIP protocols.

In known manner for the person skilled in the art, setting up a communications tunnel using the IPsec protocol requires cryptographic keys that are used for securing the exchanges over the tunnel to be exchanged between the ends of the tunnel.

In similar manner, setting up a GTP communications tunnel requires knowledge of various communications parameters: each GTP tunnel is identified in each node of the network between which it is set up by a tunnel endpoint identifier (TEID), an IP address, and a user datagram protocol (UDP) port number. It is the "receiver" end of the GTP tunnel that locally allocates the value of the TEID identifier that is used by the sender end of the tunnel to transmit data or signaling through the tunnel to the receiver end.

Finally, for the PMIP protocol, a communications tunnel is set up on the basis of a generic routing encapsulation (GRE) key.

It should be observed that the invention applies equally well to other protocols, even though they are not presently envisaged by the 3GPP standard.

The cryptographic keys used by the IPsec protocol, the identifiers of the endpoints of the communications tunnels (TEIDs), the IP addresses and the ports of these endpoints used by the GTP protocol, and the GRE keys of the PMIP protocol are all "communications parameters" in the meaning of the invention. Each switch 104 establishes correspondence between the communications parameters needed for implementing the IPsec protocol and the communications parameters needed for implementing the GTP protocol or the PMIP protocol for a session with a terminal.

In the presently-described embodiment, the terminals managed by the hybrid IP core network 100 may alternatively access services made available by the PDN networks 102 via the access network NW1, by connecting to a base station 107. In the architecture presently under consideration, the base stations 107 of the access network NW1 (typically in this example eNodeB base stations 107A, 107B, and 107C) are connected to the interconnection gateways 103 either directly or via switches 108. These switches 108 perform the same functions as the OpenFlow routers described above with reference to FIGS. 2 and 3, i.e. they operate at the level of layer 2 of the open systems interconnection (OSI) model and, by using packet headers, they route the IP data packets that pass through them between the base stations 107 and the interconnection gateways 103. These headers are GTP headers, as the base stations 107, the switches 108, and the interconnection gateways 103 in this example communicate with one another by using the GTP protocol.

In accordance with the invention, the user and control planes of the IP core network 100 are separate. This separation is provided by the control device 105 that takes on the functions of the control device OpenCTR as described above with reference to FIGS. 2 and 3.

The control device 105, which in this example is a software device, interacts with the control functions of the switches 104 and of the interconnection gateways 103 by means of APIs acting as the "NorthBound" interfaces described above with reference to FIG. 2. In this example, these control functions are represented by a control entity 109 for controlling the switches 104 in accordance with the invention, also referred to as an ePDG-c (where c refers to the control plane), and a control entity 110 for controlling interconnection gateways 103, also referred to as PGW-c.

In the example shown in FIG. 4, the control device 105 also interacts with other control entities, including:

a control entity 111 for controlling switches 108, also referred to as SGW-c;

a mobility management entity MME 112 for managing the mobility of terminals in the network NW1, that is responsible for authenticating and authorizing terminals in the network NW1, for paging the terminals, for updating tracking areas, and for managing intra-3GPP mobility;

an entity 113 for managing network policies, i.e. for performing a policy and charging rule function (PCRF); and an HSS/AAA entity 114 for managing subscribers and authentication.

In the presently-described embodiment, these various control entities are in the form of software applications executing above the software control device 105. The entities 112, 113, and 114 have functions similar or identical to those performed by the entities having the same names as defined in the LTE/EPC architecture of the 3GPP. Nevertheless, the MME entity 112 is no longer responsible in this example for selecting, for a communications session associated with the terminal, the interconnection gateway and a data transfer gateway involved during the session for exchanging data between the terminal and the PDN network. It is the control entity 111 that now selects the interconnection gateway, and where appropriate the switches 108 through which a communications session passes between a base station 107 and the interconnection gateway 103. This selection may be performed as a function of various criteria relating to load, availability, geographical location of the terminal, etc., as are known to the person skilled in the art and not described in detail herein.

Naturally, other control functions may be envisaged in the form of applications executing above the software control device 105 and interacting therewith via APIs, such as for example a DHCP control entity, etc.

In the presently-described embodiment, the entities 113 and 114 can interact directly with the control entities 109-112, e.g. using the interfaces defined by the 3GPP consortium, while the control entities 109-112 communicate with one another via the control device 105.

The software control device 105 thus centralizes the network intelligence of the interconnection gateways 103 and of the switches 104 (and where appropriate 108), and it determines the processing rules that need to be applied to the data packets they receive. These processing rules are similar to those described with reference to FIG. 3, in that they specify the processing that is to be applied by each piece of equipment of the network under the control of the control device 105 on receiving a packet of a data flow associated with a communications session of a terminal, and also the associated following packets of the same flow. In particular, they comprise various communications parameters that should be used when transmitting packets, such as for example the addresses (e.g. IP address) of the pieces of equipment towards which the packets are to be routed, identifiers of communications tunnel ends when the GTP protocol is used for transmitting packets, cryptographic keys when the packets are transmitted using the IPsec protocol, etc. These communications parameters are described in greater detail below with reference to FIGS. 6 to 9 as a function of the context in which they are used (initiating a communications session, handing over an active session from one access point to another or from one access network to another, etc.). They are stored for each terminal in a database DB of the control device 105 together with other information relating to the terminal.

In order to produce the processing rules, the control device 105 performs a plurality of control protocols that serve to support specific characteristics of users and services, such as for example protocols for managing mobility, security, applying operator policies, etc. For this purpose, it performs a plurality of functions including managing quality of service (QoS), network load balancing, managing routing, authentication, the firewall function, etc. The software control device 105 may also take account of other aspects in order to produce the processing rules that apply to the data flows relating to a terminal and that are not described in detail herein, specifically the location of the terminal, the type of service in question, network conditions at that time, packet scheduling, etc. It thus ensures that the communications sessions of user terminals accessing the core network 100 via base stations 107 of the access network NW1 or via access points 106 of the access network NW2 are set up and maintained, including for terminals in a mobility situation.

Figure 5:
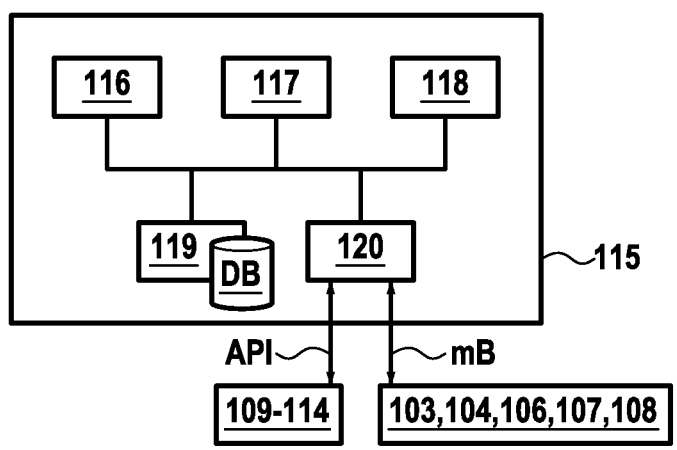
FIG. 5 shows the hardware architecture of a computer device comprising a control device in accordance with the invention.

As mentioned above, in the presently-described embodiment, the software control device 105 is a software device, in other words it is an application or a computer program executing on a computer device or computer 115. FIG. 5 is a diagram showing the hardware architecture of such a computer device 115. It comprises a processor 116, a ROM 117, a random access memory 118, a non-volatile memory 119 (storing the database DB of the device 105), and communications means 120.

These communications means are suitable in particular for communicating firstly with the control entities 109-114 via APIs as mentioned above, and secondly with the switches 104 and 108, the interconnection gateways 103, the base stations 107, and the access points 106 by using the OpenFlow protocol, or more specifically an extension of that protocol referred to herein as the "mfo interface", so as to be capable of transmitting the above-mentioned communication parameters that enable data to be routed in the user plane defined by those pieces of equipment. This mfo OpenFlow communications interface acts as a "South-Bound" interface as described above with reference to FIG. 2.

The ROM 117 of the computer device 115 constitutes a data medium in accordance with the invention that is readable by the processor 116 and that stores a computer program in accordance with the invention including instructions for executing steps of a control method of the invention including the steps that are illustrated below with reference to FIGS. 6 to 9 in a plurality of implementations.

In equivalent manner, the computer program defines various software and functional modules of the control device 105, and in particular:

- a communications module 105A for communicating with the control entities 109-114, suitable for obtaining from those entities the communications parameters that are for use during communications sessions relating to terminals managed by the IP core network 100;
- a control module 105B for controlling the user plane, suitable for producing processing rules on the basis of these communications parameters, which processing rules are for the data flows relating to the terminals and to be applied by the pieces of equipment in the user plane under the control of the control device 105; and
- a transmission module 105C for transmitting these processing rules to the pieces of equipment concerned in the user plane (among the base stations 107, the switches 104 and 108, the access points 106, and the interconnection gateways 103 in this example).

The functions of these modules are described in greater detail below with reference to FIGS. 6 to 9.

It should be observed that in the presently-described embodiment, the control entities 109-114 are also software entities executed by the computer device 115, such that the ROM 117 also has a data medium storing one or more computer programs defining these control entities. In particular, this computer program defines for the control entity 109 of the invention modules for allocating communications tunnel endpoint identifiers and/or GRE keys, and also a selection module, as described below with reference to FIGS. 6 to 9.

In a variant, these applications may be executed on distinct computer devices that communicate with one another in manners known to the person skilled in the art.

In other words, the above-mentioned computer programs define the software control device 105 and the software entities 109-114 (together with the functional modules implemented by these entities), in such a manner that in this description the references 105 and 109-114 may relate equally well to the corresponding functional entities or to the associated computer device 115 that enables those entities to be executed.

In the presently-described embodiment, the access points 106 perform standard radio functions known to the person skilled in the art for giving access to the network NW2. These functions are summarized in particular in the document 3GPP TS 23.402 entitled "Technical specification group services and system aspects; architecture enhancement for non-3GPP accesses", Release 11, September 2012.

The access points 106 are connected to the control device 105 via the above-mentioned mfo interface that relies on the OpenFlow protocol. It is via this interface that the control device 105 controls the access points 106 using data flow processing rules. For each initial request from a terminal 101, each access point 106 verifies whether the terminal is authenticated and whether it has data flow processing rules relating to that terminal (in other words a flow table for the terminal). If not, the access point 106 sends a request to the control device 105 in order to determine what action(s) it needs to undertake in the presence of data flows relating to that terminal. In a variant, it may perform an action that is defined by default.

In similar manner, the base stations 107 of the access network NW2 implement the same radio functions as those defined for eNodeB stations in the 3GPP standard, e.g. in document 3GPP TS 23.401 entitled "Technical specification group services and system aspects; general packet radio service (GPRS) enhancements for evolved universal terrestrial radio access network (E-UTRAN) network", Release 12, March 2013.

These base stations 107 communicate with the switches 108 via the S1-U interface defined by the standard, or with the interconnection gateways 103 directly, depending on the processing rules communicated by the control device 105. The S1-U interface or the direct interface between the base stations 107 and the interconnection gateways 103 relies on the GTP protocol, as mentioned above.

When a terminal issues an initial attachment request to a base station 107, the base station creates a unique identifier for the terminal on the OpenFlow protocol and transmits it to the control device 105 via the mfo interface. The control device 105 uses the same identifier to send information to the base station about the terminal, thus making it easy for the base station to recognize the terminal to which the information applies.

The interconnection gateways 103 act like sophisticated OpenFlow switches capable of encapsulating and de-encapsulating data packets relating to the terminals by using the GTP protocol or the PMIP protocol. Their actions in terms of packet routing are controlled by the processing rules produced by the control device 105 on the basis of its interactions, in particular with the control entity 110 for controlling the interconnection gateways.

In particular, when the GTP protocol is used by the interconnection gateways 103 for communicating with the switches 104 and 108 and with the base stations 107, the control entity 110 allocates:

- a unique communications tunnel endpoint identifier value (TEID) for each communications session associated with a terminal and for the uplink transmissions between a base station 107 of the network NW1 to which the terminal is connected, and an interconnection gateway 103 or between a switch 108 to which the base station 107 is connected and the interconnection gateway 103; or
- a unique communications tunnel endpoint identifier (TEID) for each communications session associated with a terminal and for the uplink transmission between a switch 104 connected to an access point 106 of the network NW2 to which the terminal is connected and the interconnection gateway 103.

The term "unique" is used to mean that this value is invariant throughout the communications session of the terminal, providing there is no change in the interconnection gateway 103 that constitutes one of the ends of the communications tunnel.

The control entity 110 is also responsible for allocating the attachment IP addresses of the terminals via a DHCP server and it decides on the quality of service support channels (or "bearers") allocated to the terminals as a function of operator policies and of the quality of service allocated to the terminals. Information about operator policies and about the quality of service allocated to the terminals is transmitted to the control entity 110 by the PCRF control entity 113 via the control device 105.

The ePDG-c control entity 109 of the switches 104 and 108 is in charge of authenticating and authorizing terminals connecting to the IP core network 100 via the access network NW2. It also allocates the communications parameters needed for setting up IPsec communications tunnels between the terminals 101 and the switches 104 and for setting up GTP or PMIP communications tunnels between the switches 104 and the interconnection gateways 103 (an S2b interface).

The ePDG-c control entity 109 is advantageously configured to act via its allocation modules to allocate the same IPsec cryptographic keys to a terminal in the event of its changing access point to the network NW2 but not changing switch, in other words it allocates a unique IPsec communications tunnel. In other words, the cryptographic keys used on the IPsec tunnel between a terminal and a switch remain the same during the communications session, even if the terminal changes access point.

In the same manner for the GTP protocol, the ePDG-c control entity 109 uses its allocation modules to allocate a unique communications tunnel endpoint identifier to a communications session of a terminal for downlink transmissions between a PGW-u interconnection gateway 103 and a switch 104. By means of the invention, the communications tunnel allocated to an active communications session does not change (i.e. the TEID identifiers do not vary). Thus, when a terminal changes access point, but does not change switch, the same communications tunnel is used for the communications session of that terminal over the S2b interface between the switch and the interconnection gateway connected to the switch.

The same applies for the PMIP protocol (a GRE key that is allocated in unique manner for a given session involving the terminal).

Thus, the invention proposes adapting the IP core network architecture defined by the 3GPP standard in the document TS 23.401 by introducing a new control plane that is orchestrated by the control device 105 and the control entities 109-114, providing greater flexibility and easier management of terminal mobility, as is illustrated in greater detail with reference to FIGS. 6 to 9. In the invention, the various communications interfaces defined by the 3GPP standard, namely the S1-MME interface (between the mobility arrangement entity MME and the base stations), the S11 interface (between the MME entity and the data transfer gateways SGW), and the S5-C interface (between the data transfer gateways SGW and the interconnection gateways PGW) are modified and replaced by the mfo interface used by the control device 105 for controlling the base stations 107, the access points 106, the switches 104 and 108, and the interconnection gateways 103. In addition, the invention proposes a new control plane for the ePDG gateways and the PGW gateways, which plane is separate from the data transfer functions performed by those gateways.

The management performed by the core network 100 of a communications session of a UE user terminal 101 as performed by this new architecture is described below in greater detail. More particularly, four procedures are described with reference to FIGS. 6 to 9 respectively, namely:
- a procedure for attaching the terminal 101 to the core network 100 by connecting via an access point of the access network NW2 (FIG. 6);
- a handover procedure for transferring an active communications session of the terminal 101 from an access point of the access network NW2 to a base station of the access network NW1 (FIG. 7);
- a handover procedure for transferring an active communications session of the terminal 101 from an initial access point of the access network NW2 to a target access point, the initial and target access points both being connected to the same switch 104 (FIG. 8); and
- a handover procedure for transferring an active communications session of the terminal 101 from an initial access point of the access network NW2 to a target access point, the initial and target access points being connected to distinct switches, that are both connected to the same interconnection gateway (FIG. 9).

These four procedures reproduce the main steps of the control method of the invention. They are merely illustrative examples of the control performed by the control device 105, and other procedures could be devised that take advantage of the SDN architecture proposed by the invention.

The attachment procedure shown in FIG. 6 enables the terminal 101 to register with the core network 100, e.g. as a result of the terminal 101 being switched on. In the example envisaged in FIG. 6, the UE terminal 101 is connected to an access point 106A of the network NW2 in order to register with the core network 100. The access point 106A is connected to the switch 104A.

On receiving an initial request issued by the terminal 101 (step E10), the access point 106A verifies whether the identity of the terminal 101 is present in a database containing the identities of the terminals that have already been authenticated and authorized by the access point.

If this identity is not present in the database (as is the case in this example, since it is a procedure for attaching the terminal), the access point 106A sends an authentication request to the terminal 101, in this example in compliance with the extensible authentication protocol (EAP) (step E20).

The terminal 101 responds to this request by sending an EAP message to the access point 106A (step E30). This message is routed by the access point 106 to the control device 105 in an OpenFlow message of the PACKET_IN type (step E40).

On receiving this message, the control device 105 transfers it to the HSS/AAA entity 114 via its communications module 105A (step E50).

The HSS/AAA entity 114 initiates exchanges via the control device 105 with the access point 106A and with the terminal 101 for the purpose of authenticating it (step E60). These exchanges reproduce the exchanges conventionally performed when a terminal is being authenticated by an HSS/AAA entity, as described in the document 3GPP TS 33.402 entitled "Technical specification group services and system aspects; 3GPP system architecture evolution (SAE); security aspects of non-3GPP accesses", Release 12, March 2012 (cf. FIG. 6.2-1 in particular), with the exception that these exchanges now pass via the control device 105.

Following authentication of the terminal 101, it initiates a procedure of setting up an IPsec communications tunnel in order to communicate with the switch 104 via the access point 106A (step E70).

In the presently-envisaged example, this procedure relies on the Internet key exchange (IKE) protocol v2. In known manner prior to IPsec transmission being possible, the IKE protocol (specifically its version 2 here) is used to authenticate both of the ends of the secure IPsec communications tunnel by an exchange of cryptographic keys shared between the two ends of the tunnel. In this example, the ends of the tunnel are the terminal 101 and the switch 104A.

This procedure is put into place between the terminal 101 and the ePDG-c control entity 109 of the switch 104A via the access point 106A and the control device 105. In other words, the terminal 101 sends its messages exchanged with the ePDG-c control entity for authenticating it using the IKEv2 protocol to the access point 106A, which transfers them in the form of OpenFlow messages to the control device 105, which in turn routes them to the ePDG-c control entity 109 via its communications module 105A. These messages comprise in particular an IKE_SA INIT initiation message and an IKE_AUTH Request authentication request comprising the identity of the terminal 101 and the access point name (APN) identifier of the external network 102 which it seeks to access.

The ePDG-c control entity 109 obtains the authentication information of the terminal 101 from the HSS/AAA server 114 via the control device 105 and acts via the control device to initiate an authentication procedure with the terminal 101 in compliance with the IKEv2 protocol.

After authentication of the terminal 101, the ePDG-c control entity 109 provides the control device 105 with the IKEv2 parameters enabling an IPsec communications tunnel to be set up between the terminal 101 and the switch 104A. These parameters comprise in particular the cryptographic keys that are to be shared and used between those pieces of equipment.

It also allocates the following to the active session of the terminal 101 for a communications tunnel between an interconnection gateway 103 and the switch 104A and for downlink transmissions:
- an endpoint identifier (TEID) of the communications tunnel, if it is the GTP (or more precisely the GTP-u) protocol that is used over the S2b interface between those two pieces of equipment; or
- a generic routing encapsulation key or GRE key for this tunnel, if it is the PMIP protocol that is used.

In addition, the ePDG-c control entity 109 acts via the control device 105 to trigger the allocation of communications parameters by the PGW-c control entity 110, these parameters being for use in setting up the communications tunnel between the PGW-u interconnection gateway 103 giving access to the PDN external network 102 identified for the terminal 101 in its IKE_RUTH Request request, and the switch 104A connected to the access point 106A (S2b interface) (step E80).

The PGW-c control entity 110 selects a PGW-u interconnection gateway 103A to be used for this session of the terminal (which selection is made in application of criteria that are conventional for the person skilled in the art, such as for example the load on and/or the availability of gateways, the PDN network to which they are connected, the location of the terminal, etc.). Thereafter it allocates to the communications tunnel between the interconnection gateway 103A and the switch 104A for uplink transmissions, using the communications protocol implemented over the S2b interface:
- a TEID identifier of the endpoint of the communications tunnel if the GTP protocol is in use; or a generic routing encapsulation key or GRE key for the tunnel if the PMIP protocol is in use.

The PGW-c control entity 110 transmits to the control device 105 the IP address of the PGW-u interconnection gateway 103A that has been selected together with the TEID identifier or the GRE key that has been allocated. These parameters constitute communications parameters in the meaning of the invention.

On receiving these communications parameters, the control device 105 stores them in its database DB and uses its control module 105B to produce processing rules for controlling the interconnection gateway 103A and the switch 104A to which the access point 106A is connected (step E90). These processing rules specify the processing that these pieces of equipment are to perform in the presence of a data packet relating to the terminal 101.

More precisely in this example, they are rules for transferring (routing or transmission) data, and they inform each of these pieces of equipment about the piece of equipment to which it is to route packets, in other words, these rules control each of these pieces of equipment in such a manner as to cause them to route received data packets towards the pieces of equipment specified in the processing rule.

Thus, in the presently-envisaged example, the control device 105 produces the following processing rules for application by the switch 104A:
- a processing rule R1 for processing data flows coming from the terminal 101 (i.e. for the uplink), and comprising:
  - the IP address of the interconnection gateway 103A; and
  - the TEID identifier of the endpoint or the generic routing encapsulation key of the communications tunnel between the switch 104A and the gateway 103A as allocated by the PGW-c control entity 110;
- a processing rule R2 for processing data flows going to the terminal 101 (i.e. for the downlink) and comprising:
  - the IP address of the access point 106A; and
  - the cryptographic keys that are to be used in the IPsec communications tunnel between the switch 104A and the terminal 101, and extracted from the IKEv2 parameters obtained by the control device 105.

Furthermore, the control device 105 produces the following processing rules for application by the interconnection gateway 103A:
- a processing rule R3 for processing data flows coming from the terminal 101 (i.e. for the uplink) comprising the access point name (APN) identifier of the external network 102 of data packets to which the terminal 101 seeks access; and
- a processing rule R4 for processing data flows going to the terminal (i.e. for the downlink) and comprising:
  - the IP address of the switch 104A; and
  - the TEID identifier of the endpoint or the generic routing encapsulation key of the communications tunnel between the interconnection gateway 103A and the switch 104A as allocated by the ePDG-c control entity 109.

The control device 105 also produces the following processing rules for application by the access point 106A:
- a processing rule R5 to be applied at IP level by the access point 106A to data flows coming from the terminal 101 (i.e. for the uplink), this processing rule comprising the IP address of the switch 104A; and
- a processing rule R6 to be applied at IP level by the access point 106A to the data flows going to the terminal 101 (i.e. for the downlink), this processing rule comprising the IP address of the terminal 101.

The control device 105 uses the processing rules R1 and R2 for controlling the switch 104A connected to the access point 106A. More precisely, it transmits these processing rules R1 and R2 to the switch 104A via its transmission module 105C in a PACKET_OUT OpenFlow message (step E100).

The switch 104A creates two new entries in a flow table associated with the terminal 101 comprising the communications parameters transmitted in the respective processing rules R1 and R2 (step E110). This flow table is similar or identical to the FTAB tables described above with reference to FIG. 3.

These entries control the behavior of the switch 104A in the presence of a data flow relating to the terminal 101 for the uplink and the downlink. In other words, on receiving a data flow from the terminal 101, the switch 104A routes that data flow towards the interconnection gateway 103A having the IP address that was supplied thereto by the rule R1 and in a communications tunnel with the interconnection gateway 103A as identified by the TEID supplied in the rule R1.

In similar manner, on receiving a data flow for the terminal 101, the switch 104A routes this data flow towards the access point 106A having the IP address that was supplied thereto by the rule R2 and in an IPsec communications tunnel set up with the terminal 101 using the cryptographic keys supplied in the rule R2.

Likewise, the control device 105 uses the processing rules R3 and R4 for controlling the interconnection gateway 103A. More precisely, it transmits these processing rules R3 and R4 to the interconnection gateway 103A by means of its transmission module 105C in a PACKET_OUT OpenFlow message (step E120).

The interconnection gateway 103A creates two new entries in a flow table associated with the terminal 101 comprising the communications parameters transmitted in the processing rules R3 and R4 respectively (step E140). This flow table is similar or identical to the FTAB tables described above with reference to FIG. 3.

These entries control the behavior of the interconnection gateway 103A in the presence of a data flow relating to the terminal 101 in the uplink and the downlink. In other words, on receiving a data flow from the terminal 101, the interconnection gateway 103A routes the data flow towards the PDN external network 102 having the APN identifier that was supplied thereto by the rule R3.

In similar manner, on receiving a data flow for the terminal 101, the interconnection gateway 103A routes the data flow to the switch 104A having the IP address that was supplied thereto by the rule R4 and in a communications tunnel with the switch 104A as identified by the TEID supplied in the rule R4.

Finally, the control device 105 uses the processing rules R5 and R6 to control the access point 106A. More precisely, it transmits these processing rules R5 and R6 to the access point 106A via its transmission module 105C in a PACKET_OUT OpenFlow message (step E140).

The access point 106A creates two new entries in a flow table associated with the terminal 101 comprising the communications parameters transmitted in the processing rules R5 and R6 respectively (step E150). This flow table is similar or identical to the FTAB tables described above with reference to FIG. 3.

These entries control the behavior of the access point 106A in the presence of data flows relating to the terminal 101 over the uplink and the downlink. In other words, on receiving a data flow from the terminal 101, the access point 106A routes that data flow towards the switch 104A having the IP address that was supplied thereto in the rule R5.

In similar manner, on receiving a data flow for the terminal 101, the access point 106A routes that data flow to the terminal 101 having the IP address that was supplied thereto by the rule R6.

It should be observed that the processing performed by the access point 106A on the data flow going to or coming from the terminal 101 is processing that is performed at IP level. The access point 106A therefore does not have the cryptographic keys exchanged between the terminal 101 and the switch 104A for setting up the IPsec communications tunnel.

After updating the flow tables of the interconnection gateway 103A and of the switch 104A, the control device 105 sends an IKE_RUTH response message to the authentication request of the terminal 101 that comprises the IKEv2 parameters (including in particular the cryptographic keys for use with the switch 104A), together with other configuration parameters as conventionally exchanged such as the IP address to use for uplink transmissions (step E160). This message transmits via the access point 106A.

This response message closes the setting up of the user plane between the terminal 101 and the PDN network 102 (step E150). In this user plane, an IPsec communications tunnel is used between the terminal 101 and the switch 104A and a GTP-u or PMIP communications tunnel is used between the switch 104A and the interconnection gateway 103A. By means of the commands from the control device 105 transmitted to the interconnection gateway 103A and to the switch 104A, data packets relating to the terminal 101 are routed directly to their destinations.

It should be observed that in order to ensure effective management of the resources of the IP core network, the access point 106A may advantageously delete its own flow table associated with the terminal 101. This may be done following a specific command from the control device 105 using an OpenFlow message, or else at the end of a time delay associated with the flow table. If this flow table is not used for the terminal 101 during a period greater than the time delay, then it is deleted automatically by the access point 106A.

Figure 7:
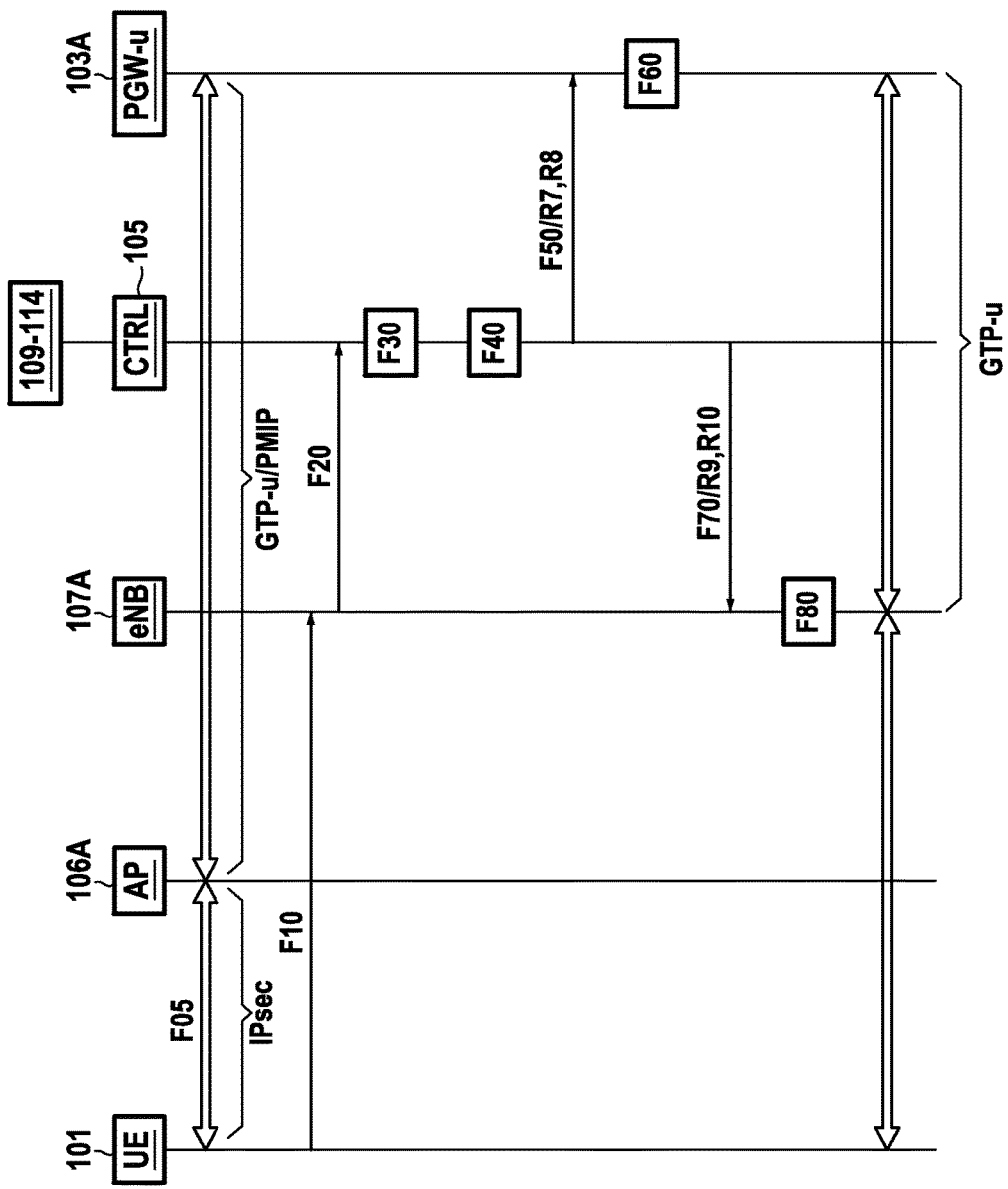
Figure 8:
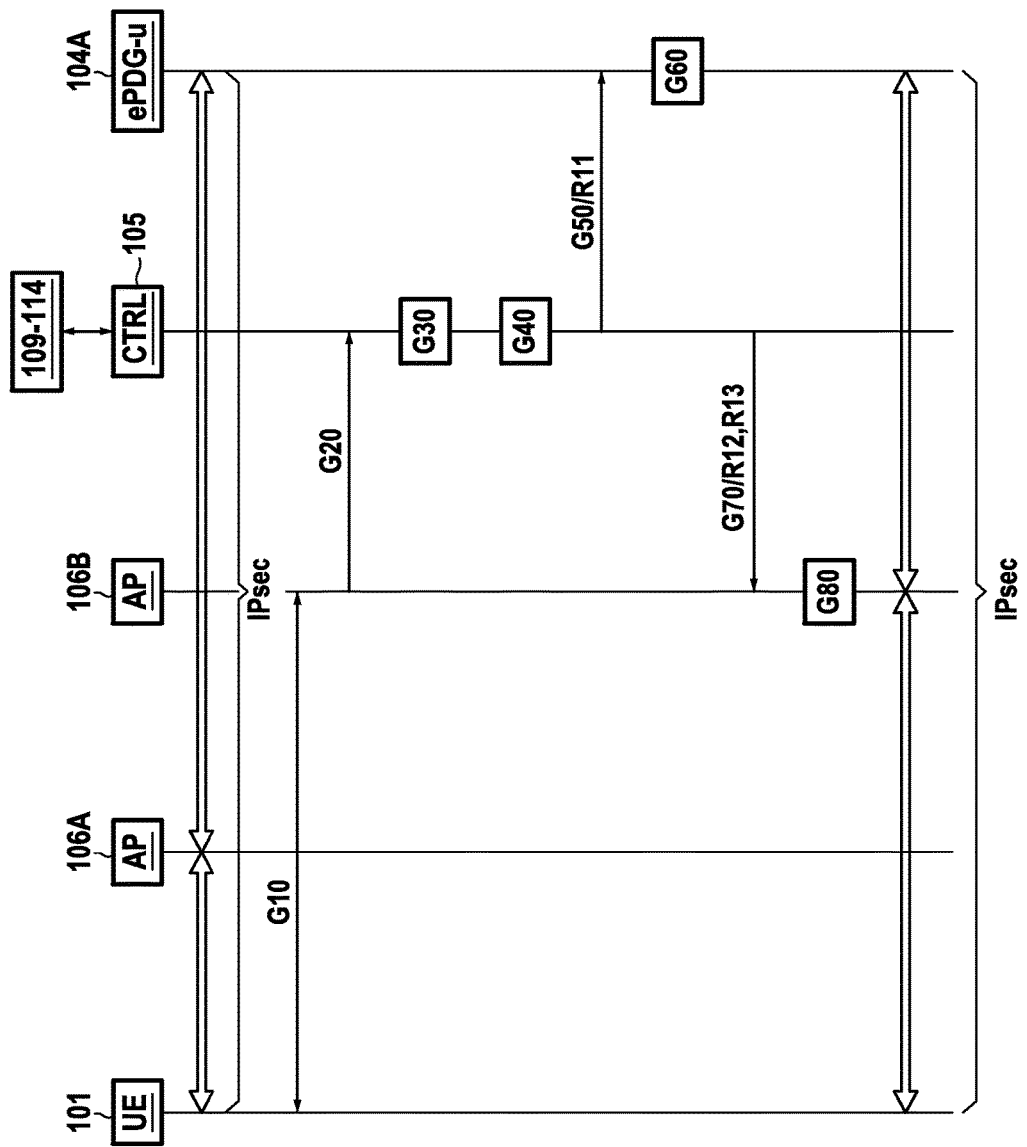
Figure 9:
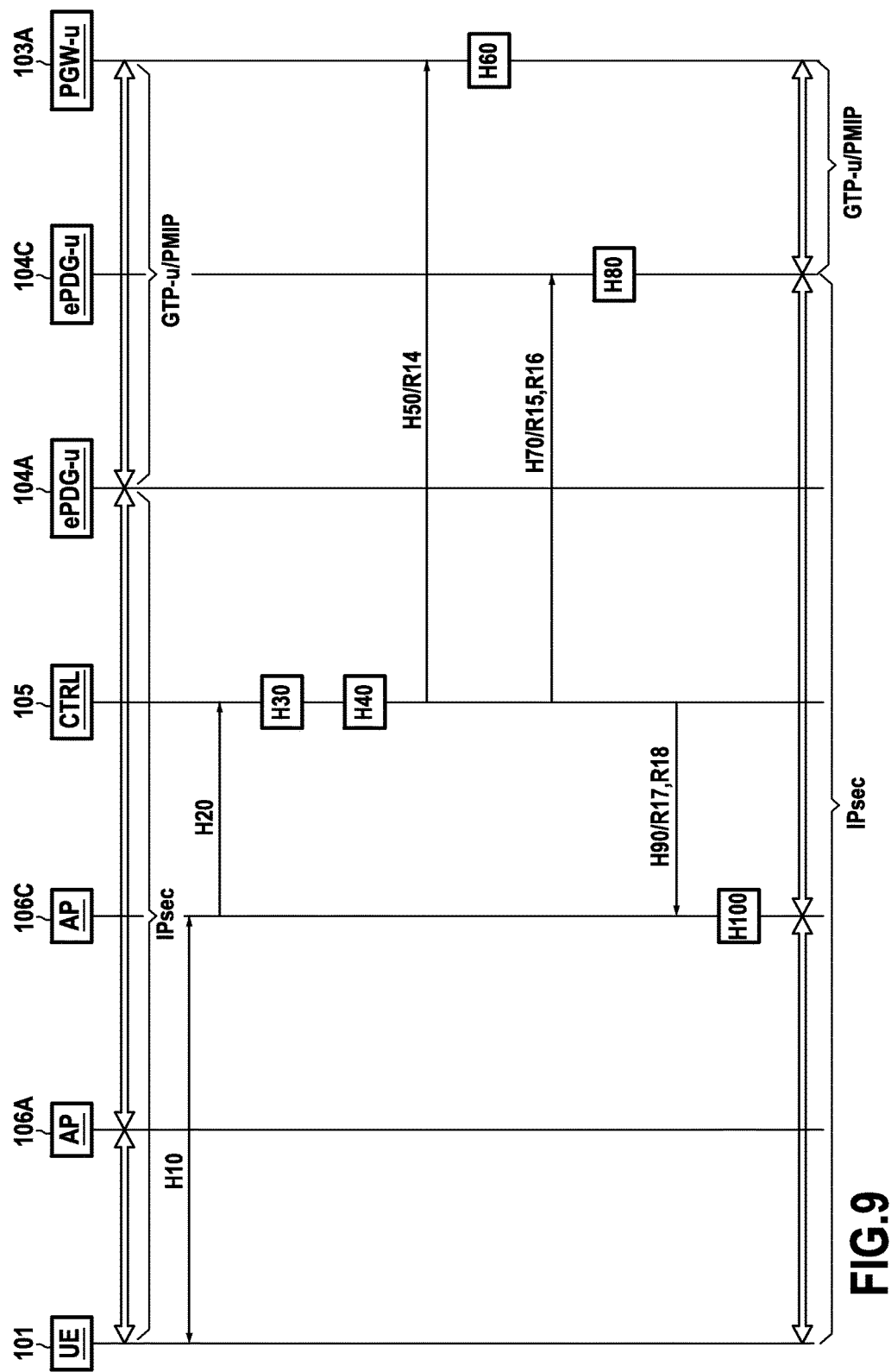

With reference to FIGS. 7 to 9, there follows a description of the handover procedures for transferring an active communications session of the terminal 101.

The handover procedure shown in FIG. 7 serves to transfer an active session of the terminal 101 from an access point of the network NW2 to a base station of the network NW1, the access point and the base station both depending on the same interconnection gateway.

In the EPC architecture as specified by the 3GPP standard, when a terminal connected to an access point of a non-3GPP access network (such as a WLAN) connects to a base station of a 3GPP access network such as an LTE network or an E-UTRAN network, all of the active communications sessions of that terminal are interrupted and the terminal needs to set those sessions up again. This has the consequence of generating a large amount of signaling in the IP core network. The architecture proposed by the invention serves to mitigate this drawback by transferring active communications sessions in transparent manner between an access point of the network NW2 to a base station of the access network NW1.

With reference to FIG. 7, it is assumed the terminal 101 is connected to an access point 106A of the network NW2 (step F05) and that the terminal moves towards a base station 107A of the access network NW1. The access point 106A is connected to the switch 104A, itself connected to the interconnection gateway 103A. An IPsec tunnel is set up between the terminal 101 and the switch 104A and a GTP-u or a PMIP communications tunnel is set up between the switch 104A and the interconnection gateway 103A.

The terminal 101 thus triggers a procedure for preparing the handover with the base station 107A. Such a procedure is itself known and is not described in greater detail herein. By way of example, it takes place in a manner identical to the handover preparation procedure described in document TS 23.401.

At the end of that procedure, the terminal 101 sends a first packet to the base station 107A (step F10). Since the base station does not have a flow table associated with the terminal 101, the packet is transferred by the base station 107A to the control device 105 in a PACKET_IN OpenFlow message (step F20).

The control device 105 de-encapsulates the message, verifies the information concerning the terminal 101 in its database DB, and sends a location message concerning the terminal 101 to the mobility management entity (MME) 112 (step F30). The mobility management entity 112 updates the location of the terminal 101 in its database and in the HSS/AAA server 114, and then sends a response to the control device 105.

On receiving this response, the control device 105 uses its control module 105B to produce the following processing rules that are to be applied by the interconnection gateway 103A:

a processing rule R7 for processing data flows coming from the terminal 101 (i.e. for the uplink) and comprising the APN identifier of the external data packet network 102 to which the terminal 101 has access via its communications session; and a processing rule R8 for processing data flows going to the terminal (i.e. for the downlink) and comprising:

the IP address of the base station 107A; and an endpoint identifier of a communications tunnel (TEID) between the interconnection gateway 103A and the base station 107A. This identifier is allocated by the base station 107A, e.g. on request from the control device 105.

Furthermore, the control device 105 uses its control module 105B to produce the following processing rules for application by the base station 107A:

a processing rule R9 for processing data flows coming from the terminal 101 (i.e. for the uplink) and comprising:

the IP address of the interconnection gateway 103A; and an endpoint identifier for the communications tunnel (TEID) between the base station 107A and the interconnection gateway 103 as allocated by the PGW-c control entity 110 of the interconnection gateway 103A. This endpoint identifier is identical to that used for identifying the GTP-u or PMIP communications tunnel between the interconnection gateway 103A and the switch 104A providing the same interconnection gateway 103A is connected to the switch 104A and to the base station 107A; and a processing rule R10 for processing data flows going to the terminal (i.e. for the downlink) comprising the IP address of the terminal 101.

The control device 105 uses the processing rules R7 and R8 to control the interconnection gateway 103A. More precisely, it transmits the processing rules R7 and R8 to the interconnection gateway 103A via its transmission module 105C in a PACKET_MOD OpenFlow message (step F50).

On receiving this message, the interconnection gateway 103A updates the entries in its flow table associated with the terminal 101 (previously containing the IP address of the switch 104A connected to the access point 106A) using the communications parameters transmitted in the respective processing rules R7 and R8 (step F60). This flow table is similar or identical to the FTAB tables described above with reference to FIG. 3.

These entries control the behavior of the interconnection gateway 103A in the presence of a data flow relating to the terminal 101 on an uplink and on a downlink. In other words, on receiving a data flow from the terminal 101, the interconnection gateway 103A routes the data flow to the PDN network 102 having the APN identifier that was supplied thereto in the rule R7.

In similar manner, on receiving a data flow for the terminal 101, the interconnection gateway 103A routes that data flow to the base station 107A having the IP address that was supplied thereto by the rule R8 and in a communications tunnel with the base station 107A identified by the TEID supplied in the rule R8.

Likewise, the control device 105 uses the processing rules R9 and R10 to control the base station 107A. More precisely, it transmits these processing rules to the base station 107A via its transmission module 105C, in a PACKET_OUT OpenFlow message (step F70).

The base station 107A creates two new entries in a flow table associated with the terminal 101 comprising the communications parameters transmitted in the respective processing rules R9 and R10 (step F80). This flow table is similar or identical to the FTAB tables described above with reference to FIG. 3.

These entries control the behavior of the base station 107A in the presence of a data flow relating to the terminal 101 on an uplink or on a downlink. In other words, on receiving a data flow from the terminal 101, the base station 107A routes the data flow to the interconnection gateway 103A having the IP address that was communicated thereto in the processing rule R9 and in a communications tunnel with that gateway as identified by the TEID contained in the rule R9.

In similar manner, on receiving a data flow for the terminal 101, the base station 107A routes the data flow to the terminal 101 having the IP address that was supplied thereto by the rule R10.

In a variant, the base station 107A uses the IP address as supplied by the terminal 101 while preparing the handover to fill the flow table for the downlink.

Once these entries have been created, a GTP-u communications tunnel identified by the TEIDs supplied in the rules R8 and R9 is set up between the base station 107A and the interconnection gateway 103A. All of the data packets relating to the communications session of the terminal 101 are now routed through this GTP-u tunnel. The active session of the terminal set up via the non-3GPP access point 106A is thus transferred without interruption to the base station 107A and without loss of packets (or with negligible loss).

The handover procedure shown in FIG. 8 serves to transfer an active session of the terminal 101 from one access point of the network NW2 to another access point of the same network NW2 that is connected to the same switch.

As mentioned above for transferring sessions from an access point of a non-3GPP network NW2 to a base station of the 3GPP network NW1, when a terminal connected to an access point of a non-3GPP access network (such as a WLAN) makes a connection to another access point of the same non-3GPP access network, all of the active communications sessions of that terminal are interrupted and the terminal needs to set these sessions up again. The architecture proposed by the invention enables this drawback to be mitigated by transferring the active communications sessions in a manner that is transparent between an access point of the network NW2 to another access point of the same network, regardless of whether or not they are connected to the same switch.

Thus, with reference to FIG. 8, it is assumed that the terminal 101 is connected to an access point 106A of the network NW2 via which it accesses the PDN external network 102. An IPsec communications tunnel is set up between the terminal 101 and the switch 104A via this access point 106A; this tunnel relies on a set of cryptographic keys previously exchanged between the terminal 101 and the switch 104A (e.g. as described above with reference to FIG. 6).

It is now assumed that the terminal 101 discovers a new access point 106B to the same access network NW2, to which it desires to connect in order to continue its communications session with the PDN external network 102, the access points 106A and 106B being connected to the same switch 104A.

The terminal 101 thus triggers a handover preparation procedure with the access point 106B (step G10). Such a procedure is itself known and is not described in greater detail herein. By way of example, it takes place in identical manner to the handover preparation procedure described in document 3GPP TS 23.402.

At the end of this procedure, the access point 106B sends a PACKET_IN OpenFlow message to the control device 105 (step G20).

The control device 105 de-encapsulates the message and verifies the information associated with the terminal 101 in its database DB (step G30).

It determines whether the terminal 101 has already been authenticated and authorized to access the IP core network 100, and it updates its database DB with the IP address of the access point 106B.

It also obtains from its database the addresses of the switch 104A to which the terminal 101 is associated together with the cryptographic keys used in the IPsec communications tunnel already set up between the terminal 101 and the switch 104A (communications parameters in the meaning of the invention).

In accordance with the invention, the control device 105 uses a unique IPsec communications tunnel between the terminal 101 and the switch 104A throughout the whole session of the terminal. In other words, the same IPsec tunnel is used between the terminal 101 and the switch 104A, regardless of whether the terminal 101 is connected to the access point 106A or to the access point 106B.

Thereafter, the control device 105 uses its control module 105B to produce a processing rule R11 for processing data flows going to the terminal 101 (i.e. for the downlink) and to be applied by the switch 104A, this rule R11 comprising the IP address of the access point 106B, optionally together with the ports to be used on the access point (step G40).

It also produces processing rules R12 and R13 for flows relating to the terminal (i.e. for the uplink and for the downlink) that are to be applied by the access point 106B, these rules R12 and R13 respectively comprising the IP addresses of the switch 104A and the IP address of the terminal 101.

The control device 105 uses the processing rule R11 to control the switch 104A. More precisely, it uses its transmission module 105C to transmit the processing rule R11 to the switch 104A in a PACKET_OUT OpenFlow message (step G50).

On receiving this message, the switch 104A updates the entry in the flow table associated with the terminal 101 for the downlink (previously containing the IP address of the access point 106A) so that it now contains the IP address of the access point 106B (a communications parameter in the meaning of the invention) as transmitted in the processing rule R11 (step G60). This flow table is similar or identical to the FTAB tables described above with reference to FIG. 3.

This entry controls the behavior of the switch 104A in the presence of a data flow for the terminal 101 on a downlink. In other words, on receiving a data flow for the terminal 101, the switch 104A now routes the data flow to the access point 106B.

It should be observed that there is no need for any updating of the flow table in the switch 104A for the uplink.

In similar manner, the control device 105 uses the processing rules R12 and R13 for controlling the access point 106B. More precisely, it transmits the processing rules R12 and R13 to the access point 106B via its transmission module 105C in a PACKET_OUT OpenFlow message (step G70).

The access point 106B creates a flow table associated with the terminal 101 comprising a first entry containing the IP address of the switch 104A as communicated in the rule R12 and a second entry containing the IP address of the terminal 101 as communicated in the rule R13 (step G80). This flow table is similar or identical to the FTAB tables described above with reference to FIG. 3.

These entries control the behavior of the access point 106B in the presence of data flows relating to the terminal 101 on an uplink and on a downlink. In other words, on receiving a data flow from the terminal 101, the access point 106B routes that data flow to the switch 104A having the IP address that was communicated thereto in the processing rule R12. In similar manner, on receiving a data flow for the terminal 101, the access point 106B routes that data flow to the terminal 101 having the IP address that was supplied thereto by the rule R13.

In a variant, the access point 106B uses the IP address as supplied by the terminal 101 while preparing the handover to fill the flow table for the downlink.

After creating these entries, messages relating to the terminal 101 are routed correctly towards their destinations via the access point 106B without any need to set up a new IPsec tunnel between the terminal 101 and the switch 104A. The transfer of the session of the terminal 101 that was initially set up with the access point 106A to the access point 106B takes place without interruption and without losing packets. It should be observed that in this example no change takes place on the S2b interface between the switch 104 and the interconnection gateway 103 to which it is connected (i.e. the same GTP-u/PMIP tunnels are used).

The handover procedure shown in FIG. 9 serves to transfer an active session of the terminal 101 from an initial access point to the network NW2 to a target access point of the network NW2, the initial and target access points being connected to different switches. For simplification purposes herein, these switches are connected to the same interconnection gateway.

Thus, it is assumed that the terminal 101 is connected to the access point 106A of the network NW2 via which it accesses the PDN external network 102. An IPsec communications tunnel is set up between the terminal 101 and the switch 104A via the access point 106A; this tunnel relies on a set of cryptographic keys previously exchanged between the terminal 101 and the switch 104A (e.g. as described above with reference to FIG. 6). Furthermore, a communications tunnel is set up in compliance with the GTP-u protocol or the PMIP protocol between the switch 104A and an interconnection gateway 103A.

It is now assumed that the terminal 101 discovers a new access point 106C to the same access network NW2 to which it desires to connect in order to continue its communications session with the PDN external network 102, the access point 106C being connected to a switch 104C that is different from the switch 104A to which the access point 106A is connected. A communications tunnel is already set up in compliance with the GTP-u protocol or the PMIP protocol between the switch 104C and the interconnection gateway 103A.

The terminal 101 then triggers a handover preparation procedure with the access point 106C (step H10) as described above with reference to FIG. 8.

At the end of this procedure, the access point 106C sends a PACKET_IN OpenFlow message to the control device 105 (step H20).

The control device 105 de-encapsulates the packet, verifies the information associated with the terminal 101 in its database, and determines that the terminal 101 has already been authenticated and authorized to access the network (step H30). It also updates its database with the IP address of the access point 106C.

Thereafter, by using its module 105A, it makes a request to the ePDG-c switch-control entity 109 for the address of a switch that is connected to the access point 106C (step H40). The ePDG-c entity 109 selects a switch 104C, that is connected to the interconnection gateway 103A (by applying conventional criteria), and it transmits the IP address of the switch 104C to the control device 105 (a communications parameter in the meaning of the invention), and, depending on the protocol used, it allocates one of the following to a communications tunnel between the switch 104C and the interconnection gateway 103A for the downlink:
    an endpoint identifier TEID of the communications tunnel
        if the GTP protocol is in use; or
    a generic routing encapsulation key or GRE key for the
        tunnel if the PMIP protocol is in use.

The control device 105 updates its database with the IP address of the switch 104C and the TEID identifier or the GRE key, and it uses its control module 105B to produce a processing rule R14 for processing the data flows going to the terminal 101 (i.e. for the downlink) that is to be applied by the interconnection gateway 103A. The rule R14 comprises:
    the IP address of the switch 104C; and
    the endpoint identifier TEID or the generic routing encapsulation key of the communications tunnel between the
        switch 104C and the interconnection gateway 103A as
        allocated by the control entity 109.

The control device 105 also uses its control module 105B to produce two other processing rules for application by the switch 104C for flows relating to the terminal 101 on an uplink and on a downlink. These rules comprise:
    a processing rule R15 for processing data flows coming
        from the terminal (uplink) and comprising:
        the IP address of the interconnection gateway 103A;
            and
        the endpoint identifier TEID or the generic routing
            encapsulation key of the communications tunnel between the switch 104C and the interconnection gateway 103A. This identifier is the same as was previously allocated to identify the communications tunnel between the switch 104A and the interconnection gateway 103A; and a processing rule R16 for processing data flows going to the terminal 101 (i.e. for the downlink) and comprising the IP address of the access point 106C, and optionally also the ports of the access point 106C.

Finally, the control module 105B of the control device 105 produces two processing rules for application by the access point 106C, and comprising:

a processing rule R17 for processing data flows for the terminal 101 (i.e. for the downlink) comprising the IP address of the terminal 101; and a processing rule R18 for processing data flows coming from the terminal (i.e. for the uplink) and comprising the IP address of the switch 106C.

The control device 105 uses the processing rule R14 to control the interconnection gateway 103A. More precisely, it uses its transmission module 105C to transmit the processing rule R14 to the gateway 103A in a PACKET-MOD OpenFlow message (step H50).

On receiving this message, the gateway 103A updates the entry in the flow table associated with the terminal 101 for the downlink (previously containing the IP address of the switch 104C) using the IP address of the switch 104C and the TEID identifier or the GRE key of the tunnel as transmitted in the processing rule R14 (step H60). This flow table is similar or identical to the FTAB tables described above with reference to FIG. 3.

This entry controls the behavior of the interconnection gateway 103A in the presence of a data flow for the terminal 101 on the downlink. In other words, on receiving a data flow for the terminal 101, the interconnection gateway 103A now routes this data flow to the switch 104C in the GTP or PMIP communications tunnel identified by the TEID transmitted in the rule R14.

In similar manner, the control device 105 uses the processing rules R15 and R16 for controlling the switch 104C. It transmits these rules to the switch 104C via its transmission module 105C in a PACKET_OUT OpenFlow message (step H70).

The switch 104C creates a flow table associated with the terminal 101 having two entries, corresponding respectively to the communications parameters transmitted in the processing rules R15 and R16 (step H80). This flow table is similar or identical to the FTAB tables described above with reference to FIG. 3.

These entries control the behavior of the switch 104C in the presence of data flows relating to the terminal 101 on the uplink or on the downlink.

Finally, the control device 105 uses the processing rules R17 and R18 for controlling the access point 106C. It transmits these rules to the access point 106C via its transmission module 105C in a PACKET_OUT OpenFlow message (step H90).

The access point 106C creates a flow table associated with the terminal 101 having two entries respectively comprising the communications parameters transmitted in the processing rules R17 and R18 (step H100). This flow table is similar or identical to the FTAB tables described above with reference to FIG. 3.

These entries control the behavior of the access point 106C in the presence of data flows relating to the terminal 101 on the uplink and on the downlink.

In a variant, the access point 106C uses the IP address supplied by the terminal 101 while preparing the handover in order to fill the flow table for the downlink.

Under such circumstances, the active session of the terminal 101 is transferred to the access point 106C without interruption or loss of packets by means of the commands from the control device 105. The data flows relating to the terminal use an IPsec communications tunnel between the terminal 101 and the switch 104C via the access point 106C, and a GTP-u or PMIP tunnel between the switch 104C and the interconnection gateway 103A. It should be observed that for effective management of the resources of the IP core network, the switch 104A may advantageously delete its flow table associated with the terminal 101. This may be done as a result of a specific command from the control device 105, or at the end of a time delay associated with the flow table. If the flow table is not used for the terminal 101 for a period longer than the time delay, it is deleted automatically by the switch 104A.

The invention claim is:

1. A control device for controlling an IP core network comprising at least one interconnection gateway suitable for connecting with at least one external packet data network and a plurality of switches, each switch connected to at least one access point of an access network, the control device configured to:

communicate with a switch control entity and with a control entity for controlling said at least one interconnection gateway, the control device configured to obtain communications parameters from said control entities for use during a communications session of a communication terminal connected to a first access point of the access network, the communications parameters comprising at least one communications parameter relating to a first communications tunnel between a first switch connected to the first access point and the communication terminal as set up for the communications session using a first communications protocol, and at least one communications parameter relating to a second communications tunnel between the first switch and a first interconnection gateway connected to the first switch as set up for the communications session using a second communications protocol distinct from the first communications protocol;

produce, on the basis of at least one of the communications parameters obtained by the control device, at least one processing rule for processing data flows relating to the communications session, the processing rule to be applied by an equipment selected from among the first interconnection gateway, the first switch, and the first access point; and transmit the at least one processing rule to the equipment for application to the data flows relating to the communications session.

2. A control device according to claim 1, wherein the control device is configured to obtain from the switch control entity at least one communications parameter selected from the following:

an address of the first switch connected to the first access point to which the communication terminal is connected;

an endpoint identifier or a generic routing encapsulation key of the second communications tunnel using the second communications protocol between the first switch and the first interconnection gateway; and at least one cryptographic key associated with the first communications tunnel using the first communications protocol between the first switch and the communication terminal.

3. A control device according to claim 1, wherein the control device is configured to obtain from the control entity of the at least one interconnection gateway an identifier of an endpoint of the second communications tunnel using the second communications protocol between the first switch and the first interconnection gateway.

4. A control device according to claim 1, wherein the at least one communications parameter relating to the first communications tunnel using the first protocol or to the second communications tunnel using the second communications protocol does not vary during the communications session of the communication terminal.

5. A control device according to claim 1, wherein, during a procedure of attaching the communication terminal to the first access point of the access network, the control device is configured to produce:
  a processing rule for processing data flows coming from the communication terminal to be applied by the first switch and comprising:
    an address of the first interconnection gateway; and
    an endpoint identifier or a generic routing encapsulation key of the second communications tunnel using the second communications protocol between the first switch and the first interconnection gateway;
  a processing rule for processing data flows for the communication terminal to be applied by the first switch and comprising:
    an address of the first access point; and
    at least one cryptographic key associated with the first communications tunnel using the first communications protocol between the first switch and the communications terminal;
  a processing rule for processing data flows coming from the communication terminal to be applied by the first interconnection gateway and comprising an identifier of an external packet data network;
  a processing rule for processing data flows for the communication terminal to be applied by the first interconnection gateway and comprising:
    an address of the first switch; and
    an endpoint identifier or a generic routing encapsulation key of the second communications tunnel using the second communications protocol between the first switch and the first interconnection gateway;
  a processing rule for processing data flows coming from the communication terminal to be applied by the first access point and comprising an address of the first switch; and
  a processing rule for processing data flows for the communication terminal to be applied by the first access point and comprising an address of the communication terminal.

6. A control device according to claim 1, wherein, during a handover procedure for transferring the communications session of the communication terminal from the first access point to a second access point of the access network, the second access point being connected to the first switch, the control device is configured to produce:
  a processing rule for processing data flows for the communication terminal to be applied by the first switch and including an address of the second access point; and
  a processing rule for processing data flows coming from the communication terminal to be applied by the second access point and including an address of the first switch.

7. A control device according to claim 1, wherein, during a handover procedure for transferring the communications session of the communication terminal from the first access point connected to the first switch to a second access point of the access network connected to a second switch, the control device is configured to produce:
  a processing rule for processing data flows for the communication terminal to be applied by the first interconnection gateway comprising:
    an address of the second switch; and
    an endpoint identifier or a generic routing encapsulation key of a third communications tunnel using the second communications protocol between the interconnection gateway and the second switch;
  a processing rule for processing data flows coming from the communication terminal to be applied by the second switch and comprising:
    an address of the first interconnection gateway; and
    an endpoint identifier or a generic routing encapsulation key of the third communications tunnel using the second communications protocol between the second switch and the interconnection gateway;
  a processing rule for processing data flows for the communication terminal to be applied by the second switch and comprising the address of the second access point; and
  a processing rule for processing data flows coming from the communication terminal to be applied by the second access point and comprising an address of the second switch.

8. A control device according to claim 1, wherein the control device is also configured to:
  produce at least one processing rule to be applied by a base station of another access network to data flows relating to the communications session; and
  transmit the at least one processing rule to the base station to be applied to the data flows relating to the communications session.

9. A control device according to claim 8, wherein during a handover procedure for transferring the communications session of the communication terminal from the first access point to the base station, the control device is configured to produce:
  a processing rule for processing data flows coming from the communication terminal to be applied by the first interconnection gateway and comprising an identifier of an external packet data network;
  a processing rule for processing data flows for the communication terminal to be applied by the first interconnection gateway and comprising:
    an address of the base station; and
    an endpoint identifier of a third communications tunnel between the first interconnection gateway and the base station set up for the communications session of the communication terminal using the second communications protocol; and
  a processing rule for processing data flows coming from the communication terminal to be applied by the base station and comprising:
    an address of the first interconnection gateway; and an endpoint identifier of the third communications tunnel using the second communications protocol between the base station and the interconnection gateway.

10. A control device according to claim 6, wherein the control device is also configured to produce a processing rule for processing data flows for the communication terminal to be applied by the second access point and including an address of the communication terminal.

11. A control device according to claim 9, wherein the control device is also configured to communicate with a mobility management entity in the other access network and to obtain the address of the at least one base station from the mobility management entity.

12. A control device according to claim 1, wherein:
the access network is a WLAN network; and/or
the first communications protocol is an IPsec protocol; and/or
the second communications protocol is a proxy mobile IP6 protocol (PMIP) or a GPRS tunneling protocol (GTP).

13. A control entity configured to control a plurality of switches of an IP core access network, each switch connected to an interconnection gateway for connection with an external packet data network and to at least one access point of an access network, the control entity configured to:
allocate at least one first communications parameter to a communications session of a communication terminal connected to a first access point of the access network, the at least one first communications parameter relating to a first communications tunnel between a first switch connected to the first access point and the communication terminal and set up for the communications session using a first communications protocol; and
allocate at least one second communications parameter to the communications session, the at least one second communications parameter relating to a second communications tunnel between the first switch and a first interconnection gateway connected to the first switch and set up for the communications session using a second communications protocol distinct from the first communications protocol.

14. A control entity according to claim 13, further configured to select the first switch of the IP core network for the communications session of the communication terminal.

15. An IP core network comprising:
at least one interconnection gateway configured to connect with at least one external packet data network;
a plurality of switches connected to the at least one interconnection gateway and to access points of an access network;
a control entity for controlling the at least one interconnection gateway;
a switch control entity for controlling the plurality of switches, the control entity configured to:
allocate at least one first communications parameter to a communications session of a communication terminal connected to a first access point of the access network, the at least one first communications parameter relating to a first communications tunnel between a first switch connected to the first access point and the communication terminal and set up for the communications session using a first communications protocol; and
allocate at least one second communications parameter to the communications session, the at least one second communications parameter relating to a second communications tunnel between the first switch and an interconnection gateway connected to the first switch and set up for the communications session using a second communications protocol distinct from the first communications protocol; and
the IP core network control device of claim 1.

16. A control method for controlling an IP core network comprising at least one interconnection gateway for connecting with at least one external packet data network and a plurality of switches, each switch connected to at least one access point of an access network, the control method being for implementation by a control device and comprising:
communicating with a switch control entity and/or with a control entity for controlling the at least one interconnection gateway, comprising obtaining communications parameters from the control entities for use during a communications session of a communication terminal connected to a first access point of the access network, the communications parameters comprising at least one communications parameter relating to a first communications tunnel between a first switch connected to the first access point and the communication terminal as set up for the communications session using a first communications protocol, and at least one communications parameter relating to a second communications tunnel between the first switch and a first interconnection gateway connected to the first switch as set up for the communications session using a second communications protocol distinct from the first communications protocol;
using at least one of the obtained communications parameters to produce at least one processing rule for processing data flows relating to the communications session, the processing rule being for application by of an equipment selected from among the first interconnection gateway, the first switch, and/or the first access point; and
transmitting the at least one processing rule to the equipment for application to the data flows relating to the communications session.

17. A computer having stored thereon instructions, which when executed by a processor of the computer, cause the processor to perform the method of claim 16.

18. A non-transitory computer-readable data medium having stored thereon instructions, which when executed by a processor, cause the processor to perform the method of claim 16.

19. A control device according to claim 7, wherein the control device is also configured to produce a processing rule for processing data flows for the communication terminal to be applied by the second access point and including an address of the communication terminal.

20. The control method of claim 16, comprising obtaining from the switch control entity at least one communications parameter selected from the following:
an address of the first switch connected to the first access point to which the communication terminal is connected;
an endpoint identifier or a generic routing encapsulation key of the second communications tunnel using the second communications protocol between the first switch and the first interconnection gateway; and
at least one cryptographic key associated with the first communications tunnel using the first communications protocol between the first switch and the communication terminal.

* * * * *